(12) United States Patent
Wang et al.

(10) Patent No.: US 12,354,318 B2
(45) Date of Patent: Jul. 8, 2025

(54) ARTIFICIAL INTELLIGENCE-BASED IMAGE PROCESSING METHOD AND APPARATUS, COMPUTER DEVICE AND STORAGE MEDIUM

(71) Applicant: Tencent Technology (Shenzhen) Company Limited, Shenzhen (CN)

(72) Inventors: Liang Wang, Shenzhen (CN); Jianhua Yao, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 380 days.

(21) Appl. No.: 17/960,804

(22) Filed: Oct. 5, 2022

(65) Prior Publication Data

US 2023/0023585 A1   Jan. 26, 2023

Related U.S. Application Data

(63) Continuation of application No. PCT/CN2021/124384, filed on Oct. 18, 2021.

(30) Foreign Application Priority Data

Nov. 2, 2020   (CN) .......................... 202011202281.0

(51) Int. Cl.
*G06V 10/26* (2022.01)
*G06T 5/20* (2006.01)
(Continued)

(52) U.S. Cl.
CPC ............. *G06V 10/267* (2022.01); *G06T 5/20* (2013.01); *G06T 5/70* (2024.01); *G06T 7/11* (2017.01);
(Continued)

(58) Field of Classification Search
CPC .... G06V 10/267; G06V 10/25; G06V 10/774; G06V 40/168; G06V 40/172;
(Continued)

(56) References Cited

U.S. PATENT DOCUMENTS

| 9,779,504 | B1 | 10/2017 | Biagiotti et al. | |
|---|---|---|---|---|
| 2016/0188954 | A1* | 6/2016 | Ajemba | G06T 7/0012 |
| | | | | 382/128 |
| 2018/0182099 | A1* | 6/2018 | Lesniak | G06V 10/993 |

FOREIGN PATENT DOCUMENTS

| CN | 108898610 A | 11/2018 |
|---|---|---|
| CN | 110059685 A | 7/2019 |

(Continued)

OTHER PUBLICATIONS

"Nasr-Esfahani, Segmentation of vessels in angiograms using convolutional neural Networks, Oct. 7, 2017, Elsevier, Biomedical Signal Processing and Control 40 (2018) 240-251" (Year: 2017).*

(Continued)

*Primary Examiner* — Oneal R Mistry
*Assistant Examiner* — Justin Philip Cascais
(74) *Attorney, Agent, or Firm* — Morgan, Lewis & Bockius LLP

(57) ABSTRACT

An artificial intelligence-based image processing method implemented by a computer device is provided. The method includes: acquiring an image; performing element region detection on the image to determine an element region in the image; detecting a target element region in the image using an artificial intelligence-based technique; generating a target element envelope region by searching an envelope for the detected target element region; and fusing the element region and the target element envelope region to obtain a target element region outline.

20 Claims, 21 Drawing Sheets

(51) Int. Cl.

| | |
|---|---|
| *G06T 5/70* | (2024.01) |
| *G06T 7/11* | (2017.01) |
| *G06T 7/136* | (2017.01) |
| *G06V 10/25* | (2022.01) |
| *G06V 10/774* | (2022.01) |
| *G06V 40/16* | (2022.01) |

(52) U.S. Cl.
CPC .............. *G06T 7/136* (2017.01); *G06V 10/25* (2022.01); *G06V 10/774* (2022.01); *G06V 40/168* (2022.01); *G06V 40/172* (2022.01); *G06T 2207/30096* (2013.01)

(58) Field of Classification Search
CPC .. G06V 10/30; G06T 5/20; G06T 5/70; G06T 7/11; G06T 7/136; G06T 2207/30096; G06T 2207/10024; G06T 2207/10056; G06T 2207/20021; G06T 2207/20036; G06T 2207/20076; G06T 2207/20084; G06T 2207/30024; G06T 7/0012; G06T 7/155; G06T 7/194; G06T 7/13; G06T 7/90; G06T 2207/20081; G06N 3/045; G06N 3/08
See application file for complete search history.

(56) References Cited

FOREIGN PATENT DOCUMENTS

| | | |
|---|---|---|
| CN | 110118775 A | 8/2019 |
| CN | 110544258 A | 12/2019 |
| CN | 110909756 A * | 3/2020 |
| CN | 111047572 A | 4/2020 |
| CN | 111582004 A | 8/2020 |
| CN | 112330688 A | 2/2021 |
| JP | 2012181743 A | 9/2012 |
| WO | WO 2019235298 A1 | 12/2019 |

OTHER PUBLICATIONS

"Yousef, Improved Automatic Detection and Segmentation of Cell Nuclei in Histopathology Images, Apr. 2010, IEEE Transactions on Biomedical Engineering, vol. 75, No. 4, pp. 841-852" (Year: 2010).*
Tencent Technology, ISR, PCT/CN2021/124384, Jan. 19, 2022, 2 pgs.
E. Nasr-Esfahani et al., "Segmentation of Vessels in Angiograms Using Convolutional Neural Networks", Biomedical Signal Processing and Control, vol. 40, Oct. 7, 2017, XP085268316, 12 pgs.
Tencent Technology, Extended European Search Report, EP21884964.4, Jan. 8, 2024, 16 pgs.
Ravian L. van Ineveld et al., "Revealing the Spatio-Phenotypic Patterning of Cells in Healthy and Tumor Tissues with mLSR-3D and STAPL-3D", Jun. 3, 2021, XP037583626, 16 pgs.
Yousef Al-Kofahi et al., "Improved Automatic Detection and Segmentation of Cell Nuclei in Histopathology Images", IEEE Transactions on Biomedical Engineering, IEEE, USA, vol. 57, No. 4, Apr. 1, 2010, XP011343206, 12 pgs.
Hilario Gómez-Moreno et al., "Goal Evaluation of Segmentation Algorithms for Traffic Sign Recognition", IEEE Transactions on Intelligent Transportation Systems, vol. 11, Iss. 4, DOI: 10.1109/TITS.2010.2054084, Dec. 2010, 14 pgs.
Sun Zhihai, "Study on Video Moving Object Detection and Subtractive Clustering Locating Technology", Retrieved from the Internet: Study on Video Moving Object Detection and Subtractive Clustering Locating Technology—CNKI, May 2009, 4 pgs.
Tencent Technology, WO, PCT/CN2021/124384, Jan. 19, 2022, 5 pgs.
Tencent Technology, IPRP, PCT/CN2021/124384, May 2, 2023, 6 pgs.

* cited by examiner

ARTIFICIAL INTELLIGENCE-BASED IMAGE PROCESSING METHOD AND APPARATUS, COMPUTER DEVICE AND STORAGE MEDIUM

CROSS-REFERENCE TO RELATED APPLICATIONS

This application is a continuation application of PCT Patent Application No. PCT/CN2021/124384, entitled "IMAGE PROCESSING METHOD APPARATUS BASED ON ARTIFICIAL INTELLIGENCE, AND COMPUTER DEVICE AND STORAGE MEDIUM" filed on Oct. 18, 2021, which claims priority to Chinese Patent Application No. 202011202281.0, filed with the State Intellectual Property Office of the People's Republic of China on Nov. 2, 2020, and entitled "ARTIFICIAL INTELLIGENCE-BASED IMAGE PROCESSING METHOD AND APPARATUS, COMPUTER DEVICE AND STORAGE MEDIUM", all of which are incorporated herein by reference in their entirety.

FIELD OF THE TECHNOLOGY

This application relates to the technical field of computers, and in particular, to an artificial intelligence-based image processing method and apparatus, a computer device and a storage medium.

BACKGROUND OF THE DISCLOSURE

Computer vision (CV) is a simulation of biological vision using a computer and related devices. CV is mainly used for processing an acquired picture or video to obtain three-dimensional information of a corresponding scenario, as people and many other creatures do every day. A very basic and important research direction in computer vision is object identification and detection. In object identification and detection, an input picture is provided; and common objects in the picture are automatically found out, and categories and locations of the common objects are outputted. The object identification and detection, such as face detection, vehicle detection and tissue detection, are widely applied to the fields including the manufacturing industry, examination, document analysis, medical diagnosis and military science.

In current object identification and detection processing methods, only a single object is often identified and detected, but an outline of a region including a target object in an image cannot be effectively identified and divided, resulting in low accuracy of image region division.

SUMMARY

According to various embodiments of this application, an artificial intelligence-based image processing method and apparatus, a computer device and a storage medium are provided.

An artificial intelligence-based image processing method is implemented by a computer device, the method including:
  acquiring an image;
  performing element region detection on the image to determine an element region in the image;
  detecting a target element region in the image using an artificial intelligence-based technique;
  generating a target element envelope region by searching for an envelope of the detected target element region; and
  fusing the element region and the target element envelope region to obtain a target element region outline.

An artificial intelligence-based image processing apparatus is provided, the apparatus including:
  an image acquisition module, configured to acquire an image;
  an element region detection module, configured to perform element region detection on the image to be processed to determine an element region in the image;
  a target element region detection module, configured to detect a target element region in the image using an artificial intelligence-based technique;
  an envelope generation module, configured to search an envelope for the detected target element region to generate a target element envelope region; and
  a region fusion module, configured to fuse the element region and the target element envelope region to obtain a target element region outline.

A computer device includes a memory and one or more processors, where the memory stores computer-readable instructions, and when the computer-readable instructions are executed by the one or more processors, the one or more processors are caused to perform the following steps:
  acquiring an image;
  performing element region detection on the image to determine an element region in the image;
  detecting a target element region in the image to be processed using an artificial intelligence-based target element region detection manner;
  generating a target element envelope region by searching an envelope for the detected target element region; and
  fusing the element region and the target element envelope region to obtain a target element region outline.

One or more non-volatile readable storage media store computer-readable instructions, and the computer-readable instructions, when executed by one or more processors, cause the one or more processors to perform the following steps:
  acquiring an image;
  performing element region detection on the image to be processed to determine an element region in the image;
  detecting a target element region in the image using an artificial intelligence-based technique;
  generating a target element envelope region by searching an envelope for the detected target element region; and
  fusing the element region and the target element envelope region to obtain a target element region outline.

Details of one or more embodiments of this application are provided in the accompanying drawings and descriptions below. Other features, objectives, and advantages of this application become apparent from the specification, the accompanying drawings, and the claims.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer, the following further describes this application in detail with reference to the accompanying drawings and the embodiments. It should be understood that the specific embodiments described herein are only used for explaining this application, and are not used for limiting this application.

The solutions provided in the embodiments of this application relate to technologies such as CV of AI, and are specifically described by using the following embodiments.

Figure 1:
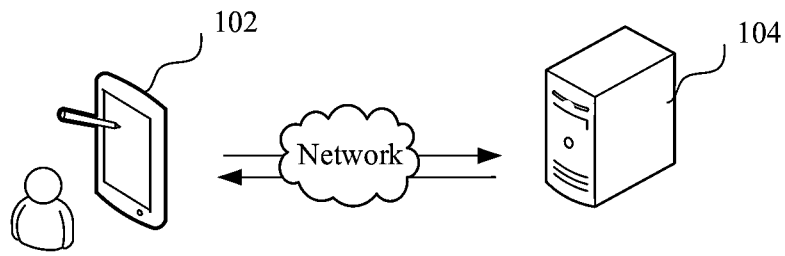
FIG. 1 is a diagram of an application environment of an artificial intelligence-based image processing method in one embodiment.

An artificial intelligence-based image processing method provided by this application is implemented by a computer device, and may be specifically applied to an application environment as shown in FIG. 1. A terminal 102 communicates with a server 104 through a network. The terminal 102 acquires images for image processing, in various scenarios, such as a landscape image, a scene image and a slice image. The terminal 102 sends the image to be processed to the server 104 to detect and divide a target element region outline. After receiving the image to be processed, the server 104 detects a target element region in the image to be processed through an artificial intelligence-based technique, searches an envelope for the target element region to obtain a target element envelope region, and then fuses the element region determined by means of element region detection with the target element envelope region to obtain the target element region outline. In addition, the server 104 may also directly acquire an image to be processed from a database for image processing, so as to identify a target element region outline in the image to be processed. The terminal 102 may be, but not limited to, various personal computers, notebook computers, smartphones, tablet computers and portable wearable devices having a picture taking function, or may be various devices capable of acquiring images, such as a camera device or a scanning device. The server 104 may be implemented with an independent server or a server cluster composed of a plurality of servers.

Figure 2:
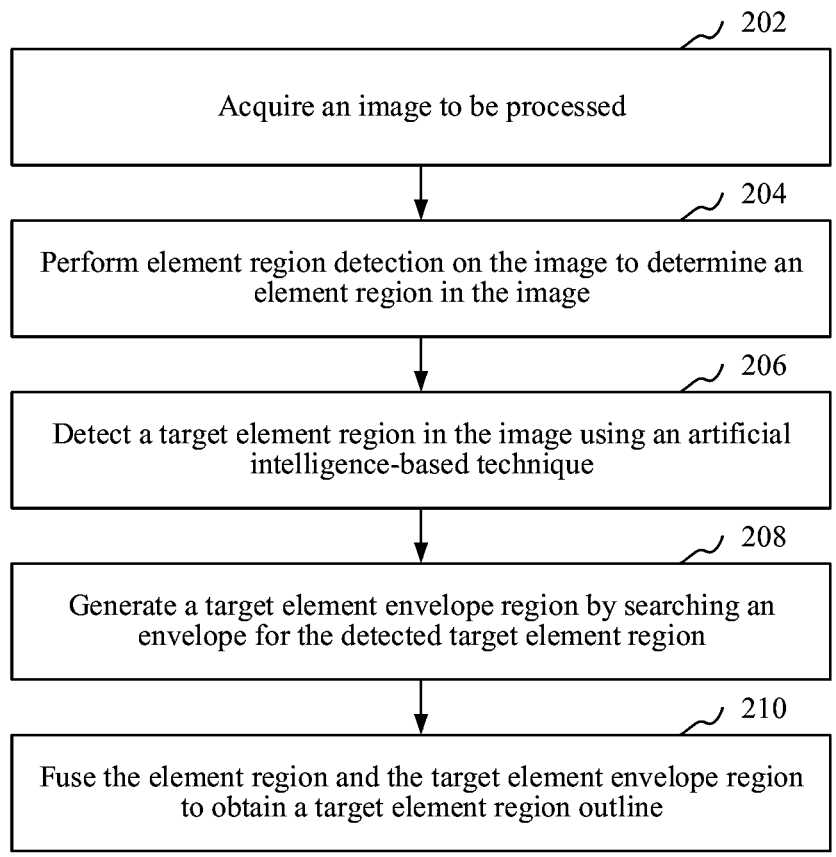
FIG. 2 is a schematic flow chart of an artificial intelligence-based image processing method in one embodiment.

In one embodiment, as shown in FIG. 2, an artificial intelligence-based image processing method is provided. Applying the method to a server in FIG. 1 is taken as an example for illustration. The method includes the following steps:

Step 202. Acquire an image to be processed.

The image to be processed is an image on which region detection and division are performed. The image to be processed may be an image taken or scanned in various scenarios, such as a landscape image taken in a field scenario, a scene image taken in a crowd scenario, a slice image scanned in a medical scenario, and other types of images. The image to be processed includes elements captured by photographing or scanning, such as a tree in the landscape image and people in the scene image. There are different types of elements, such as different kinds of trees and people of different genders. Only elements in an image are determined in most current image identification manners, but regions of different types of elements cannot be accurately determined, so that a distribution of a target element region outline in the image cannot be obtained. It is unfavorable for subsequent image analysis based on the image to be processed, such as analysis of shapes of all kinds of poplars among trees in the image and physiques of all men in the scene image.

Specifically, the image to be processed may be photographed by a photographing device, or scanned by a scanning device, and sent to the server through a network. The server performs identification and division processing of a target element region outline the received image to be processed, thus determining a distribution of the target element region outline in the image to be processed, which is convenient for the subsequent image analysis. In a specific implementation, a target element may be set according to actual needs. For example, when elements included in the image to be processed are trees, the target element may be a set specific tree species. For another example, when elements included in the image to be processed are cells, the target element may be a specific type of cells, such as white blood cells, somatic cells, and cancer cells.

Step 204. Perform element region detection on the image to be processed to determine an element region in the image to be processed.

An element is an object, captured by photographing or scanning, in the image to be processed, and a region outline of a target element for detection is a certain type of element. For example, if the element is a tree, the target element may be different parts (such as a tree leaf or a tree trunk) of a tree or different species of trees. For another example, if the element is a dog, the target element may be different parts of the dog. The element region refers to a distribution range of an element in the image to be processed, such as a distribution range of a variety of species of trees in the image to be processed. In a specific application, the element is determined according to an actual scenario of image processing. For example, the element may also be a cell in a slice image, and the element region is a cell region in the slice image, that is, the sliced tissue region. The element region detection is used for detecting the element region in the image to be processed. Specifically, the element region detection may be specifically performed on the image to be processed using various object detection algorithms, such as a region with convolutional neural networks features (R-CNN) algorithm, a you only look once (YOLO) algorithm, and a single shot detector (SSD) algorithm, so as to determine the element region in the image to be processed. In addition, prior knowledge may also be used. For example, color feature prior knowledge of elements and non-elements in the image to be processed is used. The element region in the image to be processed is detected using color features of various pixel points in the image to be processed.

Specifically, after acquiring the image to be processed, the server determines a corresponding element region detection manner according to a type characteristic of the element in the image to be processed, and performs the element region detection on the image to be processed through the element region detection manner, so as to determine the element region in the image to be processed.

Step 206. Detect a target element region in the image to be processed using an artificial intelligence-based technique.

The target element may be a subtype element in the element, that is, the target element is an element to be detected in the element. The target element region is a distribution range of the target element in the image to be processed. The target element region detection manner is achieved on the basis of artificial intelligence. The target element region detection may be achieved on the basis of a machine learning model. For example, the target element region may be detected through various image segmentation algorithm models such as a fully convolutional networks (FCN) model, a deep convolutional encoder-decoder architecture for image segmentation (SegNet) model, and a relational embedding for scene graph (Linknet) model to obtain the target element region in the image to be processed.

Specifically, during the performing target element region detection on the image to be processed, the server detects the target element region on the basis of the artificial intelligence-based technique, such as performing the target element region detection manner on the image to be processed using a pre-trained detection model.

Step 208. Search an envelope for the detected target element region to generate a target element envelope region.

The target element envelope region is a preliminary target element region outline obtained by searching the envelope on the basis of the target element region. Specifically, after detecting the target element region in the image to be processed by the artificial intelligence-based technique, the server searches the envelope for the target element region. Specifically, an envelope line capable of including various target element regions can be found by means of connecting the various target element regions; and the target element envelope region is generated according to a region enclosed by the envelope line. By means of searching the envelope for the target element region, the influence of an error in an image processing process can be reduced, and the accurate target element envelope region is obtained.

In a specific implementation, the server can connect the target element regions to obtain a connected region; the server then removes a non-target element region from the connected region, so as to ensure that target element identification results within the connected region are all accurate; and finally, the server performs smoothing processing on the connected region without the non-target element region, such as performing the smoothing processing by means of morphological expansion, to obtain the target element envelope region with a smooth edge; and meanwhile, a relatively small region is denoised by means of the morphological expansion, which improves the accuracy of identification and division of the target element envelope region.

Step 210. Fuse the element region and the target element envelope region to obtain a target element region outline.

After the element region and the target element envelope region are obtained, the element region and the target element envelope region are fused to obtain the target element region outline, which overall shows the distribution range of the target element in the image to be processed. Specifically, the server can solve an intersection between the element region and the target element envelope region, and determine the intersection between the element region and the target element envelope region to be the final target element region outline. The target element region outline integrates a detection result of the element region detection on the image to be processed and a detection result of the artificial intelligence-based target element region detection on the image to be processed, so that the influence of an error in a single detection manner can be effectively reduced, and the accuracy of detection and division of the target element region outline is high.

In the above-mentioned artificial intelligence-based image processing method, a target element region in the image to be processed is detected through an artificial intelligence-based technique; an envelope is searched for the target element region to obtain a target element envelope region; and the element region determined by means of element region detection is fused with the target element envelope region to obtain the target element region outline. The envelope is searched for the target element region detected through the artificial intelligence-based technique, so that the accurate target element envelope region can be obtained by effectively using the detection result of the artificial intelligence-based technique; meanwhile, by means of fusing the element region in the image to be processed with the target element envelope region, the target element envelope region can be corrected using a result of the element region detection, and the accuracy of the detected and divided target element region outline is improved.

Figure 3:
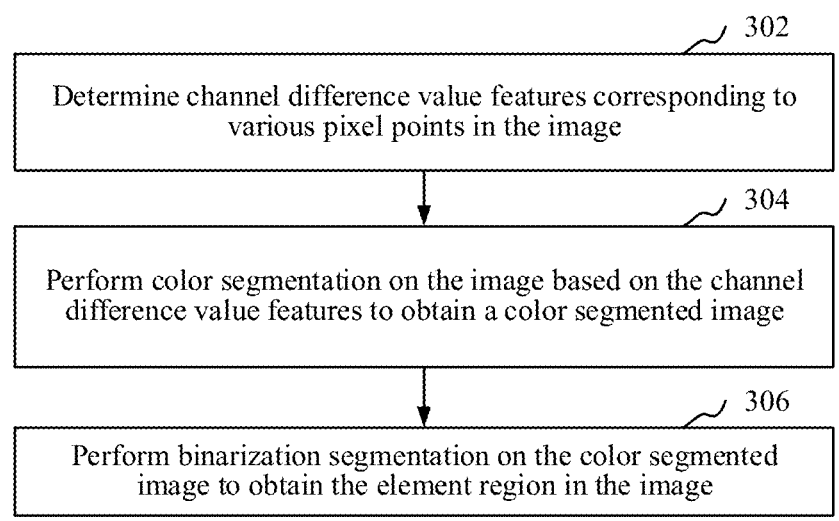
FIG. 3 is a schematic flow chart of element region detection in one embodiment.

In one embodiment, as shown in FIG. 3, the process of the element region detection processing, namely the process of performing element region detection on the image to be processed to determine to determine an element region in the image to be processed, includes:

Step 302. Determine channel difference value features respectively corresponding to various pixel points in the image to be processed.

In this embodiment, the element region detection is performed on the image to be processed using prior knowledge of element color features, so as to determine the element region in the image to be processed. Specifically, an element and a non-element in the image to be processed have an obvious color difference. For example, when snow and a non-snow object in the image to be processed of a snowfield scenario have an obvious color difference, the element region detection can be achieved according to color features of various pixel points in the image to be processed. For another example, a stained element and an unstained element in a stained image of a physiological slice have an obvious color difference, so that stained element region detection can be achieved according to color features of various pixel points in the stained image.

The channel difference value features are used for describing the color features of the various pixel points in the image to be processed, and may be specifically obtained according to difference values between channel values corresponding to various color channels of the pixel points. For example, when the image to be processed is an RGB color image, each pixel point in the image to be processed corresponds to three color channels R, G and B, and a channel difference value feature may be obtained according to difference values between channel values of the three color channels R, G and B, such as, according to a maximum difference value between the channel values of the three color channels R, G and B. In a specific application, the server can traverse the channel values of the various color channels corresponding to the various pixel points in the image to be processed, and determine, according to the various channel values, the channel difference value features of the corresponding pixel points.

Step 304. Perform color segmentation on the image to be processed on the basis of the channel difference value features respectively corresponding to the various pixel points to obtain a color segmented image.

The color segmented image is obtained by performing the color segmentation processing on the image to be processed according to the channel difference value features corresponding to the various pixel points. For example, the pixel values of the various pixel points of the image to be processed may be updated according to the channel difference value features corresponding to the various pixel points, so that the color segmentation is performed on the image to be processed using the channel difference value features corresponding to the various pixel points, thereby obtaining the color segmented image. The color segmented image reflects a color feature of the image to be processed. For example, if the channel difference value feature is the maximum difference value between the channel values of the various color channels, during the color segmentation, the channel difference value feature directly replaces the pixel value of the corresponding pixel point, so that the obtained color segmented image reflects that the various pixel points of the image to be processed tend to be grey or colorful; if the various pixel points tend to be grey, the maximum difference value between the channel values of the various color channels is relatively small, and the numerical value of the channel difference value feature is relatively small, so that the corresponding pixel points in the color segmented image tend to be black, otherwise, the corresponding pixel points in the color segmented image tend to be white; therefore, a color region and a neutral region in the image to be processed can be directly determined; if the image to be processed is a stained image obtained by staining elements, the color region in the image to be processed is the element region, and the element region is effectively detected using the prior knowledge.

Specifically, after obtaining the channel difference value features corresponding to various pixel points in the image to be processed, the server performs the color segmentation on the image to be processed on the basis of the various channel difference value features. For example, the server updates the pixel values of the corresponding pixel points in the image to be processed on the basis of the various channel difference value features, so as to achieve performing the color segmentation on the image to be processed using the channel difference value features to obtain the color segmented image.

Step 306. Perform binarization segmentation on the color segmented image to obtain the element region in the image to be processed.

The binarization segmentation refers to further segmenting the color segmented image, so as to determine the element region in the image to be processed. Specifically, the pixel points in the color segmented image may be traversed by means of a preset binarization segmentation threshold for binarization segmentation; binary mapping is performed on the pixel values of the various pixel points in the color segmented image; and for example, the pixel points can be mapped to be white or black, so that the element region in the image to be processed can be directly determined according to a binarization segmentation result. The binarization segmentation threshold may be flexibly set according to actual needs. For example, it may be set to be a determined pixel value, or may be adaptively set according to the pixel values of the various pixel points in the color segmented image. For example, the corresponding binarization segmentation threshold is set according to a mean of the pixel values of the various pixel points, so as to perform the binarization segmentation on the color segmented image more accurately.

Specifically, after obtaining the color segmented image, the server performs the binarization segmentation on the color segmented image, for example, the server may acquire the preset binarization segmentation threshold, or set the binarization segmentation threshold according to the channel difference value features corresponding to the various pixel points in the image to be processed, and perform, through the binarization segmentation threshold, the binarization segmentation on the color segmented image, so that the element region in the image to be processed is obtained according to the binarization segmentation result.

In a specific application, the image to be processed may be divided according to a region of interest. For example, the image to be processed is divided by a region of interest with 100*100 pixels to obtain various regions of interest corresponding to the image to be processed, and the element region detection is performed on the various regions of interest to obtain element regions in the various regions of interest; and the element regions in the various regions of interest are finally stitched to obtain the element region in the image to be processed. The image to be processed is divided by means of the regions of interest and then subjected to the element region detection, so that the data volume for detection processing in the element region at a time can be reduced; and furthermore, the various regions of interest can be concurrently processed, and the processing efficiency of the element region detection can be effectively improved.

In this embodiment, the color segmentation is performed on the image to be processed using the color features of the element, and the mapping segmentation is further performed on the color segmented image in combination with the binarization segmentation, so that the comparison degree between the element region and the non-element region can be increased through the binarization segmentation while the element region detection is accurately performed by effectively using the prior knowledge; and the accuracy of the element region detection is further improved, and the element region in the image to be processed is accurately determined.

In one embodiment, the step of determining channel difference value features respectively corresponding to various pixel points in the image to be processed includes: determining a pixel value respectively corresponding to each pixel point in the image to be processed; obtaining various color channel values of the corresponding pixel point according to the pixel value; and determining a maximum channel difference value between the various color channel values, and obtaining, according to the maximum channel difference value, the channel difference value feature.

In this embodiment, a channel difference value feature is obtained according to the maximum channel difference value between the channel values of the various color channels corresponding to each pixel point in the image to be processed, and pixel value mapping is performed on the various pixel points in the image to be processed on the basis of the maximum channel difference values, so as to achieve the image segmentation of the image to be processed to obtain the color segmented image. The color channel values of the various pixel points in the image to be processed correspond to numerical values of each color channel of the pixel points. The color channel values are related to a color space where the image to be processed is located. For example, if the image to be processed is an RGB image, the color space of the image to be processed includes R, G and B, correspondingly including 3 color channel values. For example, if the pixel values of a certain pixel point are (123, 15, 255), the color channel values of the pixel point are 123, 15 and 255. The maximum channel difference value refers to a maximum value of difference values between the various color channel values corresponding to the pixel points. Specifically, the maximum channel difference value may be obtained by subtracting every two of the various color channel values and searching, according to the calculated difference values, a maximum value. The maximum channel difference value reflects a difference degree of the various color channels of the pixel point. A larger maximum channel difference value indicates a larger difference of the various color channels of the pixel point. If the pixel point is rich in color, the pixel point tends to be colorful. A smaller maximum channel difference value indicates a smaller difference of the various color channels of the pixel point. If the pixel point is not rich in color, the pixel point tends to be grey.

Specifically, during the determination of the channel difference value features corresponding to the various pixel points in the image to be processed, the server determines the pixel values corresponding to the various pixel points in the image to be processed. Specifically, the server may traverse the various pixel points in the image to be processed to read the pixel values of the various pixel points. After obtaining the pixel values corresponding to the various pixel points, the server parses the pixel values corresponding to the various pixel points, and determines the various color channel values of the various pixel points. Generally, the pixel value of the pixel point is obtained by combining the color channel values of the various color channels according to a certain order. The color channel values corresponding to the various color channels may be determined according to the pixel value on the basis of the pixel value and a combination rule of the color channel image. The server calculates a difference between every two of the various color channel values, and determines, according to a difference calculation result, a maximum channel difference value of the pixel point. In addition, the server may also determine a maximum value and a minimum value among the various color channel values, and directly determine, according to an absolute value of a difference value between the maximum value and the minimum value, the maximum channel difference value of the pixel point. The server obtains the channel difference value feature according to the obtained maximum channel difference value, for example, the maximum channel difference value may be directly used as the channel difference value feature of the corresponding pixel point.

Further, the process of performing color segmentation on the image to be processed on the basis of the channel difference value features respectively corresponding to the various pixel points to obtain a color segmented image includes: performing pixel value mapping on the image to be processed according to the maximum channel difference values corresponding to the various pixel points to obtain the color segmented image.

The pixel value mapping refers to performing, on the basis of the maximum channel difference values, mapping processing on the pixel values of the various pixel points in the image to be processed, so as to perform the color segmentation on the image to be processed according to the maximum channel difference values. For example, corresponding channel difference value pixels may be determined according to the maximum channel difference values, and the pixel values of the corresponding pixel points in the image to be processed are updated according to the channel difference value pixels, thus achieving the color segmentation on the image to be processed; and the color segmented image is obtained after all the pixel points in the image to be processed are traversed.

Specifically, after the determination of the maximum channel difference values corresponding to the various pixel points in the image to be processed, the server performs the pixel value mapping on the pixel values of the corresponding pixel points in the image to be processed according to the maximum channel difference values corresponding to the various pixel points, so as to update the pixel values of the corresponding pixel points on the basis of the maximum channel difference values and achieve the color segmentation on the image to be processed. For example, the server may generate the channel difference value pixels according to the maximum channel difference values. If the maximum channel difference value of a certain pixel point in the image to be processed is 200, an RGB channel difference value pixel (200, 200, 200) may be generated, and the channel difference value pixel is mapped to be the pixel value of the pixel point; the pixel value of the pixel point is mapped through the maximum channel difference value to achieve the color segmentation on the image to be processed to obtain the color segmented image.

In this embodiment, a channel difference value feature is obtained according to the maximum channel difference value between the channel values of the various color channels corresponding to each pixel point in the image to be processed, and pixel value mapping is performed on the various pixel points in the image to be processed on the basis of the maximum channel difference values, so that accurate color segmentation can be performed on the image to be processed by effectively using the color features of the various pixel points, which ensures the accuracy of the color segmented image.

In one embodiment, the step of performing binarization segmentation on the color segmented image to obtain the element region in the image to be processed includes: denoising the color segmented image to obtain a denoised image; acquiring a binarization segmentation threshold; performing binarization segmentation on the denoised image on the basis of the binarization segmentation threshold and pixel values corresponding to various pixel points in the denoised image to obtain the element region in the image to be processed.

Denoising the color segmented image is performing fuzzy denoising on the color segmented image, so as to remove noise from the color segmented image to further improve the confidence level of the color segmented image. The binarization segmentation threshold may be preset according to actual needs. For example, it may be preset to be a determined pixel value, or may be preset according to the pixel values of the various pixel points in the color segmented image. The binarization segmentation is further segmenting the color segmented image by means of binarization processing. Specifically, the binarization segmentation may be performed on the various pixel points according to the binarization segmentation threshold and pixel values corresponding to various pixel points in the denoised image, thus obtaining the element region in the image to be processed according to the binarization segmentation.

Specifically, during the performing of the binarization segmentation on the color segmented image, the server denoises the color segmented image. For example, the server may perform Gaussian fuzzy denoising on the color segmented image. The intensity of one pixel point may be related to surrounding points by means of the Gaussian fuzzy denoising to reduce the influence of mutation, thus obtaining an interference-removed denoised image. The server may acquire the binarization segmentation threshold specifically by inquiring the preset binarization segmentation threshold, or by determining the binarization segmentation threshold according to the pixel values of the various pixel points in the color segmented image or the denoised image. For example, the binarization segmentation threshold may be determined according to the maximum channel difference values corresponding to the various pixel points in the image to be processed. In addition, if the image to be processed is divided into various regions of interest for element region detection, the binarization segmentation threshold may be set respectively according to the regions of interest. For example, the binarization segmentation threshold is determined according to the maximum channel difference values corresponding to the various pixel points in the various regions of interest, so that the binarization segmentation threshold of the various regions of interest is flexibly set, which improves the fitness of the binarization segmentation threshold to the various regions of interest, improves the effectiveness of binarization segmentation and ensures the division accuracy of the element region. After the obtaining the binarization segmentation threshold, the server performs the binarization segmentation on the denoised image on the basis of the binarization segmentation threshold and the pixel values corresponding to the various pixel points in the denoised image. For example, the server may perform binarization mapping on the pixel values corresponding to the various pixel points in the denoised image according to a size relationship between the binarization segmentation threshold and the pixel values corresponding to the various pixel points in the denoised image, which achieves the binarization segmentation on the denoised image to obtain the element region in the image to be processed.

In this embodiment, after the noise in the color segmented image is removed by denoising, the binarization segmentation is performed on the denoised image on the basis of the binarization segmentation threshold, so as to segment the denoised image through the binarization segmentation threshold to accurately obtain the element region and the non-element region in the image to be processed by division.

In one embodiment, the step of performing binarization segmentation on the denoised image on the basis of the binarization segmentation threshold and pixel values corresponding to various pixel points in the denoised image to obtain the element region in the image to be processed includes: determining the pixel values corresponding to the various pixel points in the denoised image; performing, on the basis of the binarization segmentation threshold, pixel binarization mapping respectively on the pixel values corresponding to the various pixel points in the denoised image to obtain pixel mapping results corresponding to the various pixel points in the denoised image; and obtaining the element region in the image to be processed according to the pixel mapping results corresponding to the various pixel points in the denoised image.

In this embodiment, the pixel binarization mapping is performed, on the basis of the binarization segmentation threshold, on the pixel values corresponding to the various pixel points in the denoised image, and the element region in the image to be processed is obtained according to the pixel mapping results corresponding to the various pixel points. Specifically, during the performing of the binarization segmentation on the denoised image, the server determines the pixel values corresponding to the various pixel points in the denoised image. For example, the server may traverse the various pixel points in the denoised image to determine the pixel values corresponding to the various pixel points. The server traverses the various pixel points in the denoised image, and performs, on the basis of the binarization segmentation threshold the pixel binarization mapping on the pixel values corresponding to the various pixel points in the denoised image. Specifically, the binarization segmentation threshold is numerically compared with the pixel values corresponding to the various pixel points; pixel points with the pixel values greater than the binarization segmentation threshold and pixel points with the pixel values not greater than the binarization segmentation threshold are respectively mapped to have different pixel values, such as black or white pixel values, so as to intuitively divide element pixel points and non-element pixel points in the image to be processed, and the element region in the image to be processed may be determined according to the various element pixel points. The element pixel points refer to pixel points, belonging to the element, in the image to be processed, and the non-element pixel points are pixel points not belonging to the element. That is, the various pixel points in the element region are all the element pixel points, and the pixel points in the non-element region are the non-element pixel points. After the performing, on the basis of the binarization segmentation threshold, pixel binarization mapping respectively on the pixel values corresponding to the various pixel points in the denoised image to obtain pixel mapping results corresponding to the various pixel points in the denoised image, the server obtains the element region in the image to be processed according to the pixel mapping results corresponding to the various pixel points. For example, after the binarization mapping is performed on the pixel values corresponding to the various pixel points in the denoised image, the pixel points mapped to be the element pixel values in the pixel mapping results may be determined to be the element pixel points, and the pixel points mapped to be the non-element pixel values may be determined to be the non-element pixel points. For example, when the element pixel value is white, and the non-element pixel value is black, the pixel points with the pixel mapping results of being white in the denoised image are determined to be the element pixel points, and the pixel points with the pixel mapping results of being black in the denoised image are determined to be the non-element pixel points; all the element pixel points with the pixel mapping results of being white in a region may be determined to be the element region in the image to be processed, thus achieving accurate segmentation of the element region.

In one embodiment, the step of detecting a target element region in the image to be processed using an artificial intelligence-based technique includes: inquiring a target element region detection model pre-trained using training image data labeled with the target element region; performing target element region detection on the image to be processed through the target element region detection model to obtain a target element region probability graph; and performing target element region determination on the target element region probability graph, and obtaining, according to a determination result, the target element region in the image to be processed.

The target element region detection model is pre-trained through the training image data labeled with the target element region. The target element region detection model may perform target element region detection on an input image to output the target element region probability graph. The target element region probability graph represents a probability that the various pixel points in the image to be processed reflect a target element. The target element region in the image to be processed may be determined by means of determining the probability in the target element region probability graph.

Specifically, during the performing of the target element region detection on the image to be processed, the server inquires the pre-trained target element region detection model, and the target element region detection model is trained by the training image data labeled with the target element region. The training image data labeled with the target element region may be directly labeled on the basis of a target element with obvious features, so that the labeling is more accurate, and the training effect of the training image data can be ensured. The server performs the target element region detection on the image to be processed through the inquired target element region detection model. Specifically, the image to be processed can be inputted into the target element region detection model for target element region detection, and the target element region detection model outputs a detection result which includes the target element region probability graph. The server makes a determination on the target element region probability graph outputted by the target element region detection model to determine whether the various pixels in the target element region probability graph indicate the target element, and determines, according to a determination result, the target element region in the image to be processed.

In this embodiment, the target element region detection model pre-trained by the training image data labeled with the target element region performs the target element region detection on the image to be processed, and makes a determination on the target element region probability graph outputted by the target element region detection model to determine the target element region in the image to be processed. The pre-trained target element region detection model performs the target element region detection, which can achieve effective detection on the target element region to identify the accurate target element region from the image to be processed, In one embodiment, the step of performing target element region detection on the image to be processed through the target element region detection model to obtain a target element region probability graph includes: acquiring various regions of interest obtained by region division processing of the image to be processed; respectively inputting the various regions of interest into the target element region detection model for target element region detection to obtain region of interest probability graphs outputted by the target element region detection model and respectively corresponding to the various regions of interest; and stitching the various region of interest probability graphs to obtain the target element region probability graph corresponding to the image to be processed.

In this embodiment, after the image to be processed is divided into the regions of interest, the target element region detection model performs the target element region detection respectively on the various regions of interest, and the detection results corresponding to the regions of interest are stitched to obtain a target element region detection model corresponding to the image to be processed. The regions of interest are obtained by performing region division on the image to be processed. For example, the region division may be performed on the image to be processed according to a preset size, so that the image to be processed is divided into several regions of interest, which reduces the data volume of single processing and improves the data processing efficiency. In a specific implementation, the size of each region of interest may be set according to actual needs. Each region of interest may be directly set to be a fixed size, such as including 1000*1000 pixels.

Specifically, during the performing of the target element region detection on the image to be processed through the target element region detection model, the server acquires the various regions of interest obtained by the region division processing of the image to be processed. The region division for the regions of interest may be achieved during the performing of the target element region detection on the image to be processed. The various regions of interest obtained by the region division during the element region detection may be directly acquired during the performing of the target element region detection on the image to be processed. The server respectively inputs the various regions of interest into the target element region detection model for target element region detection to obtain the various region of interest probability graphs outputted by the target element region detection model. The region of interest probability graph records the probability that the pixels in the corresponding region of interest are detected as the target element region. The server stitches the various region of interest probability graphs respectively corresponding to the various regions of interest to obtain the target element region probability graph corresponding to the image to be processed, thus achieving the target element region detection on the image to be processed.

In this embodiment, the target element region detection is performed, through the target element region detection model, respectively on the various regions of interest obtained by the region division processing of the image to be processed, and the detection results corresponding to the various regions of interest are stitched to obtain a target element region detection result corresponding to the image to be processed, so that the data volume for detection processing in the target element region at a time can be reduced; and furthermore, the various regions of interest can be concurrently processed, and the processing efficiency of the target element region detection can be effectively improved.

In one embodiment, the step of performing target element region determination on the target element region probability graph, and obtaining, according to a determination result, the target element region in the image to be processed includes: acquiring a probability threshold; performing probability binarization mapping on the target element region probability graph on the basis of the probability threshold and probability values corresponding to various pixel points in the target element region probability graph to obtain probability mapping results of the various pixel points in the target element region probability graph; and obtaining the target element region in the image to be processed according to the probability mapping results of the various pixel points in the target element region probability graph.

The probability threshold is preset according to actual needs, such as 0.5. The probability threshold is used for performing the target element region determination on the target element region probability graph, and the target element region in the image to be processed is determined according to the target element region. Specifically, after the obtaining the target element region probability graph outputted by the target element region detection model, the server acquires the preset probability threshold, and the probability threshold is used for performing the binarization mapping on the probability values of the various pixel points in the target element region probability graph. The server performs the probability binarization mapping on the target element region probability graph on the basis of the probability threshold and the probability values corresponding to the various pixel points in the target element region probability graph. Specifically, the server may compare the probability values corresponding to the various pixel points in the target element region probability graph with the probability threshold respectively, and performs, according to comparison results, the probability binarization mapping on the various pixel points to obtain probability mapping results of the various pixel points in the target element region probability graph. For example, the probability threshold is 0.5. If the probability value of pixel point A in the target element region probability graph is 0.8 and the probability value of pixel point B is 0.2, the pixel value of pixel point A is mapped to be a white pixel value, and the pixel value of pixel point B is mapped to be a black pixel value, so as to achieve binarization mapping on pixel point A and pixel point B. After all the pixel points are traversed, the binarization mapping on the target element region probability graph is achieved. After the obtaining of the probability mapping results of the various pixel points in the target element region probability graph, the server obtains the target element region in the image to be processed on the basis of the various probability mapping results. For example, the server may determine the pixel points that are mapped to be the target element pixel values in the various probability mapping results as the target element pixel points, and determine, according to all the target element pixel points, the target element region in the image to be processed.

In this embodiment, the probability binarization mapping is performed on the target element region probability graph through the preset probability threshold, so as to determine the target element region in the image to be processed according to the probability mapping results of the various pixel points in the target element region probability graph, and the target element region and the non-target element region in the image to be processed may be intuitively and accurately divided through the binarization mapping, so that the accuracy of division of the target element region is ensured.

In one embodiment, the step of searching an envelope for the detected target element region to generate a target element envelope region includes: performing region connection on the target element region in the image to be processed to generate a target element connected region; removing a non-target element region located in the target element connected region to obtain an updated target element connected region; and performing morphological expansion on the updated target element connected region to obtain the target element envelope region.

In this embodiment, after the region connection is performed on the detected target element region, a non-target element in the connected region is removed, so that the non-target element within the connected region is filtered; smoothing processing is performed on an edge of the connected region by means of the morphological expansion, and a smaller region of the connected region is denoised, so that the envelope is searched for the detected target element region, and the target element envelope region with high identification and division accuracy is obtained.

Specifically, after the target element region in the image to be processed, the server performs region connection on the target element region in the image to be processed. Specifically, the server may traverse the target element region and the non-target region in the image to be processed through a filter with a preset size, so as to perform the region connection on the target element region in the image to be processed through the filter to generate the target element connected region. The server then filters out the non-target element within the generated target element connected region, so as to ensure that elements in the target element connected region are all the target elements. Specifically, the server removes the non-target element region from the target element connected region. For example, the server may directly update the non-target element region in the target element connected region to a target element region to obtain an updated target element connected region. The interior of the updated target element connected region is the target element region. Further, the server performs the smoothing processing on the edges of the updated target element connected region. Specifically, the target element envelope region is obtained by performing the morphological expansion on the updated target element connected region. By means of performing the morphological expansion on the updated target element connected region, the smoothing processing may be performed on the edge of the updated target element connected region; and meanwhile, the smaller region at the edge of the updated target element connected region is effectively denoised to further improve the identification and division accuracy of the target element envelope region.

In one embodiment, the step of performing region connection on the target element region in the image to be processed to generate a target element connected region includes: performing filtering division on the target element region and the non-target region in the image to be processed to obtain various filtering regions; performing region type analysis on the basis of pixel values of pixel points in the various filtering regions to obtain analysis results; and connecting the filtering regions which have the analysis results indicating a connected region type, and generating the target element connected region.

In this embodiment, after the target element region and the non-target region in the image to be processed are divided to obtain the various filtering regions, the region type analysis is performed on the various filtering regions respectively; whether the filtering regions belong to the connected region type is determined on the basis of the analysis results; and the filtering regions belonging to the connected region type are connected to generate the target element connected region.

Specifically, during the connection of the target element region in the image to be processed, the server performs filtering division on the target element region and the non-target region in the image to be processed to obtain the various filtering regions. The size of the filtering division may be determined according to the size of the filter. For example, if the size of the filter is 10*10 pixels, the target element region and the non-target region in the image to be processed are divided according to the filter to obtain various filtering regions in the size of 10*10 pixels. After the determination of the various filtering regions, the server performs the region type analysis on the pixel values of the pixel points in the various filtering regions. Specifically, the server may traverse all the filtering regions. For the various pixel points in each filtering region, if it is detected that there is a target element pixel point, that is, if there is a target element pixel point in the filtering region, it is determined that the filtering region belongs to the connected region type, that is, the filtering region may be considered to be a target element region and may be connected. After the analysis results of each filter are obtained, the server connects those filter regions, having the corresponding analysis results indicating the connected region type, among the various filtering regions to obtain the target element connected region. In a specific implementation, during the connection of the various filter regions of the connected region type, the server maps the pixel values of the pixel points in the filtering regions of the connected region type to target element pixel values, and connects the mapped filtering regions of the connected region type, thus generating the target element connected region.

In specific applications, the image to be processed may be traversed directly through the set filter; within a range of the filter for processing the various filtering regions, whether there is a target element pixel point may be, for example, determined according to the pixel values of the various pixel points in the processing range of the filter; if there is a pixel value corresponding to a target element pixel point, it indicates that there is a target element pixel point, and the filtering region is determined to belong to the connected region type; and the pixel values of the various pixel points in the connected region are mapped to the pixel value corresponding to the target element pixel point. For example, if the pixel value corresponding to the target element pixel point is a white pixel value, and the filter detects a white pixel point in the filtering region, all the pixel points in the filtering region are mapped to white pixel points, that is, the filtering region is a region for connection processing. After the filter completely traverses the image to be processed, the filtering regions of the connected region type are connected to generate the target element connected region.

In one embodiment, the artificial intelligence-based image processing method further includes: Superimpose the target element region outline to the image to be processed, and identify the target element region outline in the image to be processed in a predetermined identification manner.

The identification manner may be flexibly preset according to actual needs, such as a highlighted outline line and a symbol. Specifically, after the target element region outline is divided and detected from the image to be processed, the server superimposes the target element region outline into the image to be processed, and identifies the target element region outline in the image to be processed in the predetermined identification manner, so that the target element region outline is intuitively identified from the image to be processed, which is convenient for subsequent image analysis based on the target element region outline and the image to be processed.

This application also provides an application scenario where the above-mentioned artificial intelligence-based image processing method is applied. Specifically, the application of the artificial intelligence-based image processing method in this application scenario is as follows:

The image to be processed is a landscape image, a scene image, etc., and landscape objects in a landscape, such as trees, snow and gravels, are elements, or people or animals in the scene image are elements. Trees of different species are target elements, or different parts of a tree are target elements, or different people, such as men, women, children or old people, are target elements, or dogs, cats or animals of different species in the scene image may also be the target elements. In addition, different parts of people or animals may also be target elements, such as the hairs or the faces of people, or such as the bodies, the limbs or the heads of the animals. A target element is determined according to a region outline needing to be detected.

In a specific application, the server acquires a captured landscape image, performs element region detection on the landscape image, and determines a tree region in the landscape image. In another aspect, a tree leaf region in the landscape image is detected using an artificial intelligence-based technique, and an envelope is searched for the detected tree leaf region to generate a tree leaf envelope region; and the tree region and the tree leaf envelope region are fused to obtain a tree leaf region outline. The tree leaf region outline intuitively shows a distribution of the tree leaf region outline in the landscape image, which is convenient for subsequent image analysis.

This application further provides an additional application scenario where the above-mentioned artificial intelligence-based image processing method is applied. Specifically, the application of the artificial intelligence-based image processing method in this application scenario is as follows:

In this application scenario, the image to be processed is a stained whole slide image (WSI); cells in a slide are elements, and different types of cells are target elements, such as white blood cells, somatic cells, and cancer cells.

In one specific application, the stained WSI is a slice image based on a breast pathology PD-L1 (programmed cell death-Ligand 1, programmed death factor ligand 1, ligand of PD-1) method. In breast cancer treatment, the number of immune cells (expression of PD-L1) can be obtained by the PD-L1 method, and the ability to resist cancer is further evaluated on the basis of the number of immune cells. That is, a medication method for treating cancer is selected by means of estimating a score of stained immune cells (ICs) in a tumor region. However, there are only qualitative methods for estimating the number of ICs at present, but no quantitative methods, resulting in an inaccurate estimate of an IC ratio.

Figure 4:
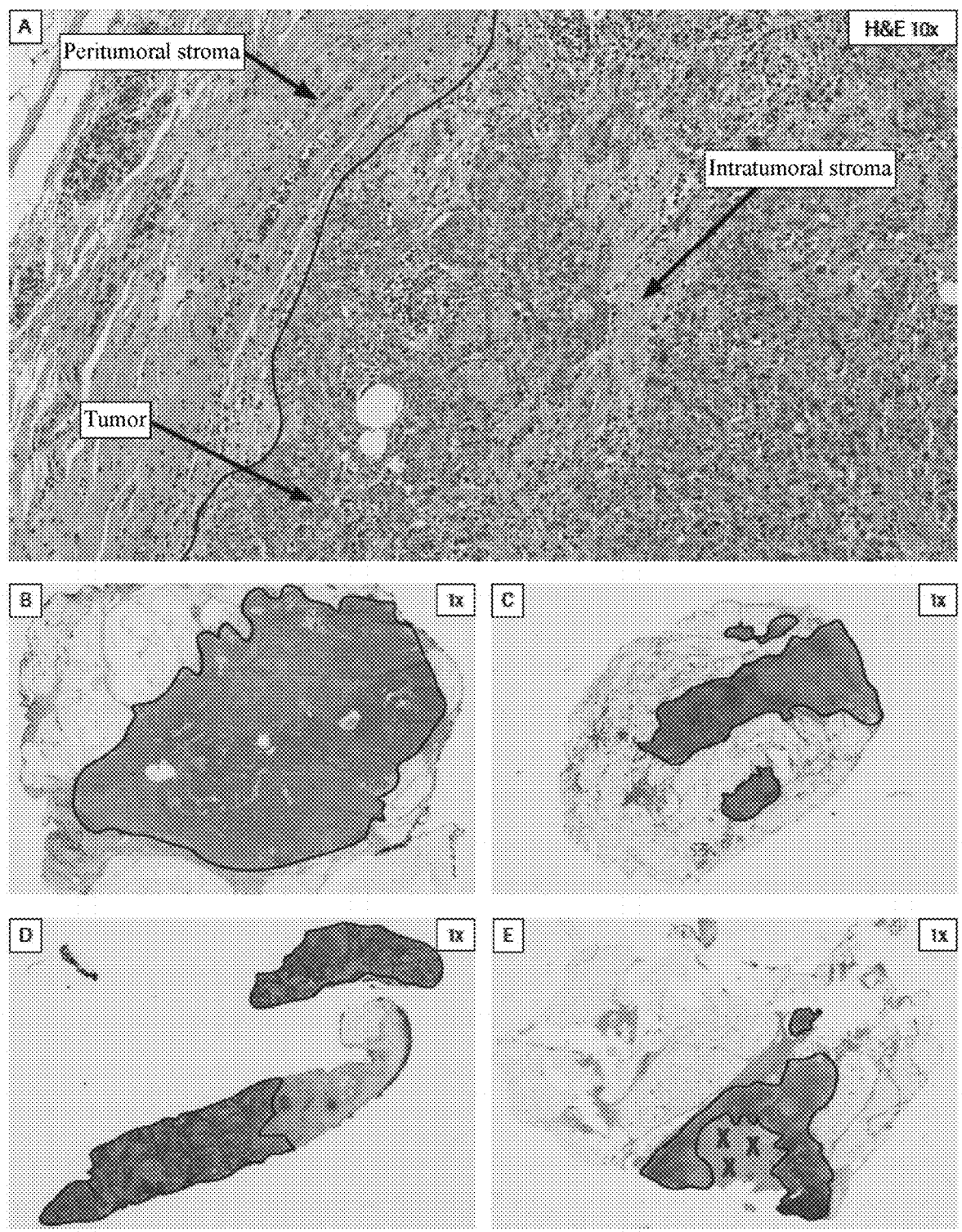
FIG. 4 is a schematic diagram of a tumor in a hematoxylin-eosin (HE) stained image in one embodiment.

At present, using an immunohistochemical method to evaluate the immune efficacy based on PD-1 (programmed death 1, programmed death molecule receptor 1 which is a receptor protein on the surfaces of T cells serving as the immune cells)/PD-L1 has become the focus of research and hot spot. Changes in the expression of PD-L1 are related to tumor progression and poor prognosis, and PD-L1 is considered to be an effective biomarker for predicting prognosis. Breast cancer is the most common malignant tumor in women, and precision medicine provides an opportunity for more refined and individualized treatment of breast cancer. At present, a diagnosis and treatment method for treating unresectable locally advanced triple-negative breast cancer (TNBC) or metastatic TNBC by combining a paclitaxel protein binder. As shown in FIG. 4, there are 5 kinds of performance of the tumor in a hematoxylin-eosin (HE) stained image. FIG. A shows a locally observed image after the HE stained image is amplified for 10 times. It can be shown that a stained sliced tissue can be divided into peritumoral stroma and intratumoral stroma in a tumor region. FIG. B, FIG. C, FIG. D and FIG. E are the staining results of different sliced tissues. The distribution of the tumor can be determined through the HE stained image for subsequent diagnosis and treatment analysis. Roche proposed a guidance method for interpreting an IC value based on stain SP142. Specifically, the HE staining WSI is first observed to acquire a tumor region in the HE stained image; an observation result is mapped to the PD-L1 stained image; and an IC score is determined by further combining the HE stained image and the PD-L1 stained image.

Figure 5:
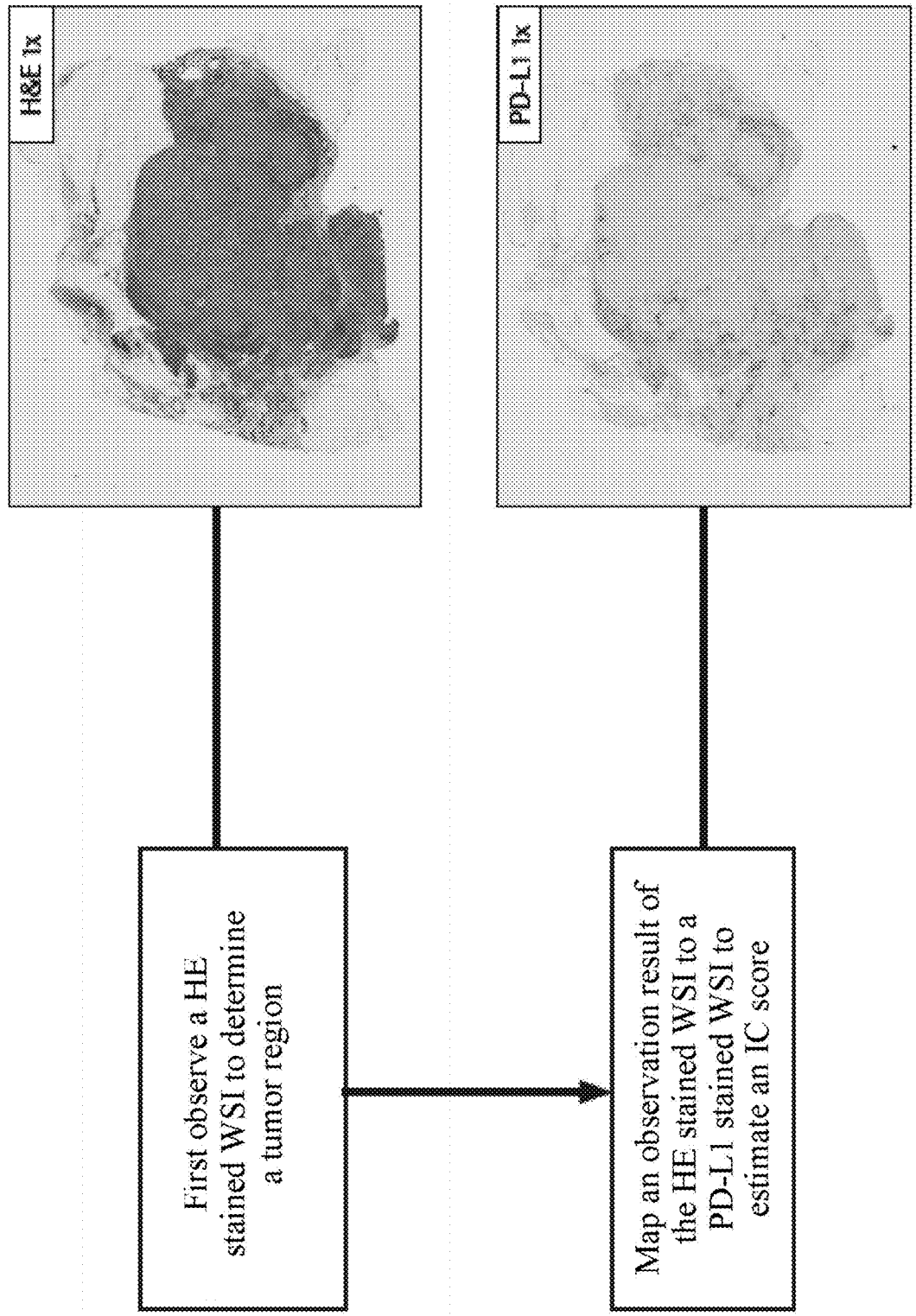
FIG. 5 is a schematic flow chart of a traditional immune cell (IC) score analysis method.
Figure 6:
FIG. 6 is a comparison diagram of an HE staining whole slide image (WSI) and a PD-L1 staining WSI in one embodiment.
Figure 7:
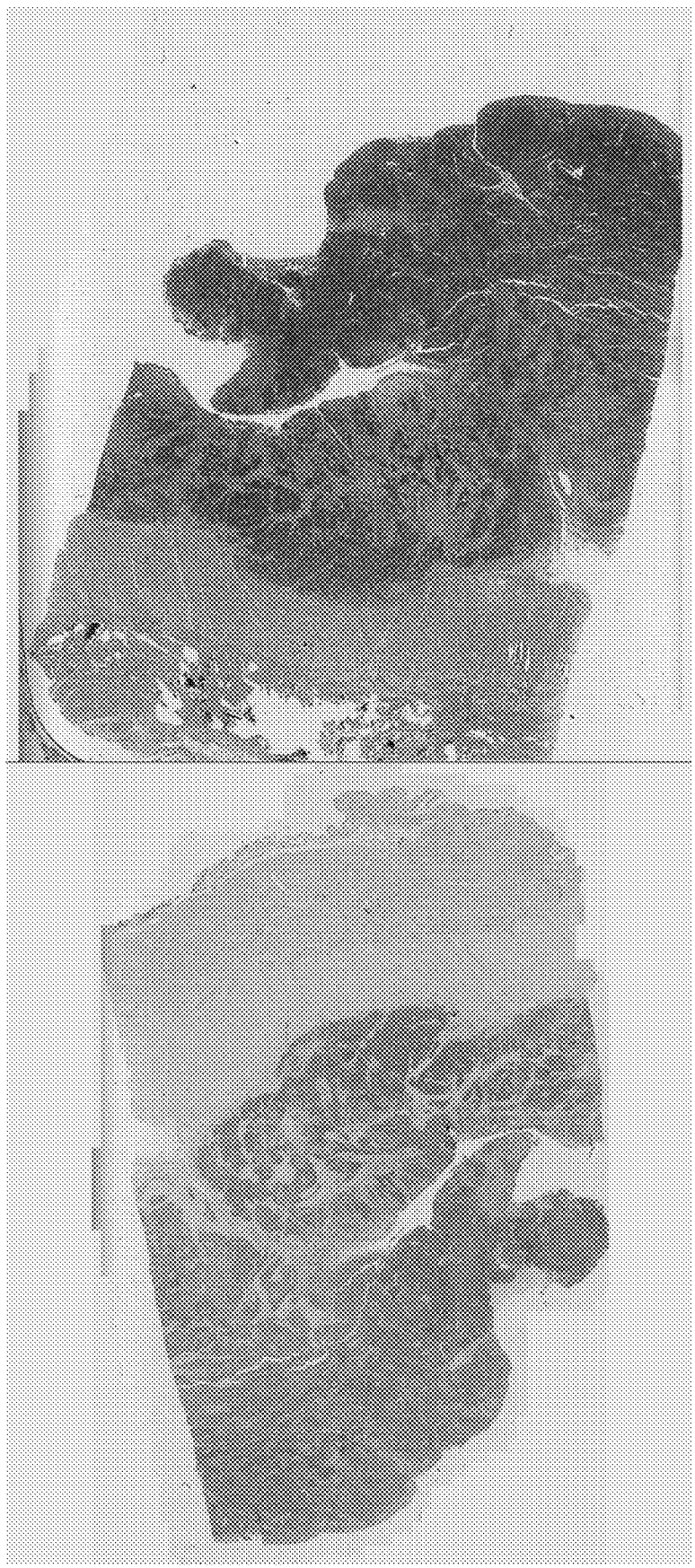
FIG. 7 is a comparison diagram of an HE staining WSI and a PD-L1 staining WSI in another embodiment.
Figure 8:
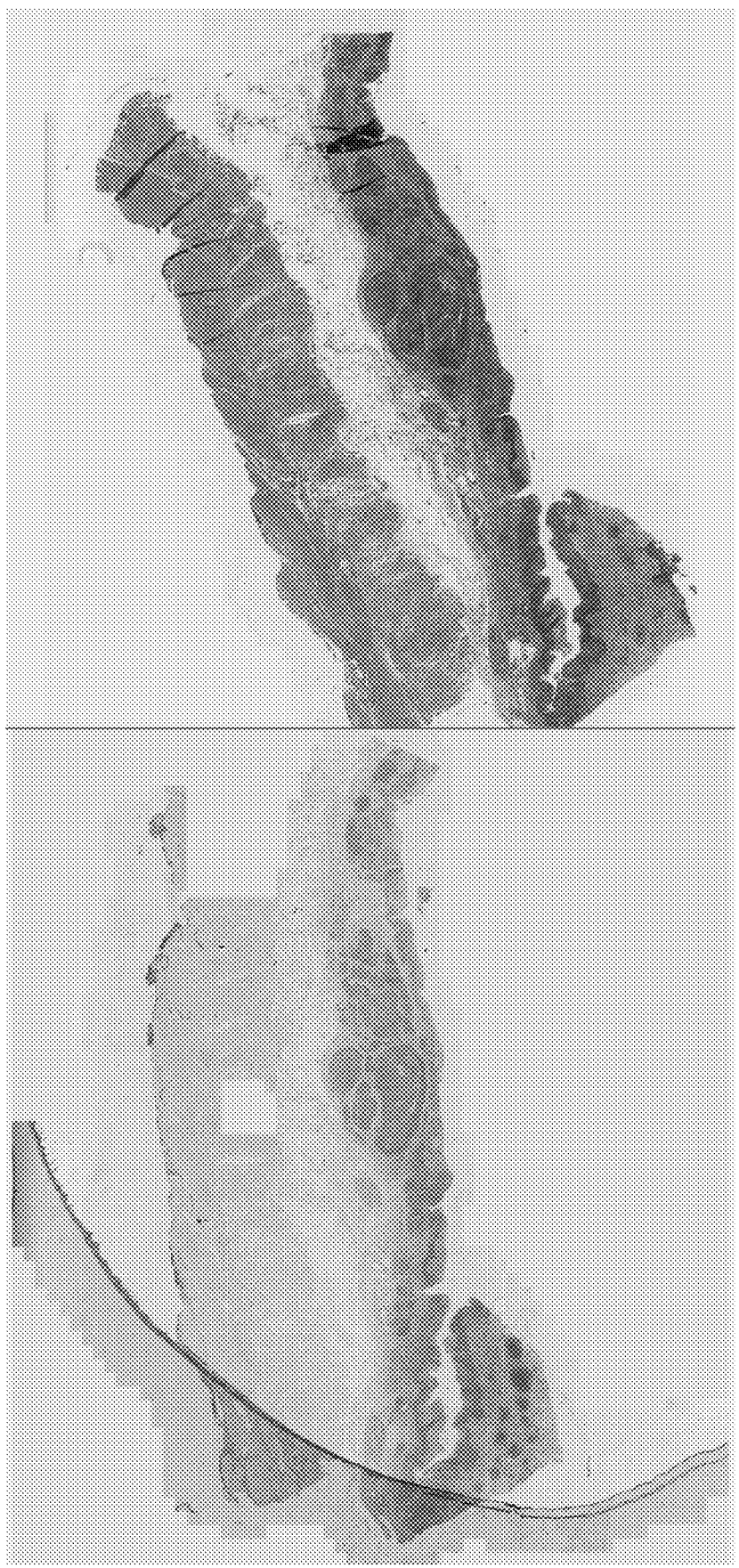
FIG. 8 is a comparison diagram of an HE staining WSI and a PD-L1 staining WSI in yet another embodiment.

As shown in FIG. 5, in a traditional IC score analysis process, the HE staining WSI is first observed to determine a tumor region, and then an observation result of the HE staining WSI is mapped to the PD-L1 staining WSI, so that an IC score is estimated for image analysis. Specifically, during the observation of the HE staining WSI, it is necessary to determine whether there is a tumor and necrosis in the HE staining WSI. In order to ensure adequacy, at least 50 living tumor cells and stroma need to be detected. In addition, an area of a tumor region can also be estimated. It can be seen that in the traditional processing method for estimating the IC score, 2 kinds of different staining WSIs are required, that is, 2 slides need to be made. One slide is stained with an HE stain, and the other slide is stained with a PD-L1 stain, which obviously increases the workload of image analysis. Furthermore, it is difficult to keep the images obtained with the two stains exactly the same. To make 2 different stained slides, 2 pieces of different cancer tissues need to be cut from a wax block, so that there will be an error in the acquired WSIs; and translation, rotation and the like of locations affect the estimation of the IC score. As shown in FIG. 6-FIG. 8, comparisons of HE staining WSIs and PD-L1 staining WSIs in different embodiments are illustrated. It can be seen that the HE staining WSI and the PD-L1 staining WSI in FIG. 6 are rotated to a certain extent; the HE staining WSI and the PD-L1 staining WSI in FIG. 7 are flipped; and the HE staining WSI and the PD-L1 staining WSI in FIG. 8 are rotated and translated to a certain extent. Therefore, a tumor tissue region is acquired from the HE staining WSI, and the same region is found from the PD-L1 staining WSI. When the tumor region is mapped to the PD-L1 staining WSI for IC score estimation, it is hard to achieve effective mapping. As a result, the accuracy of estimation of an IC score is greatly reduced, and the accuracy of image analysis is low.

Figure 9:
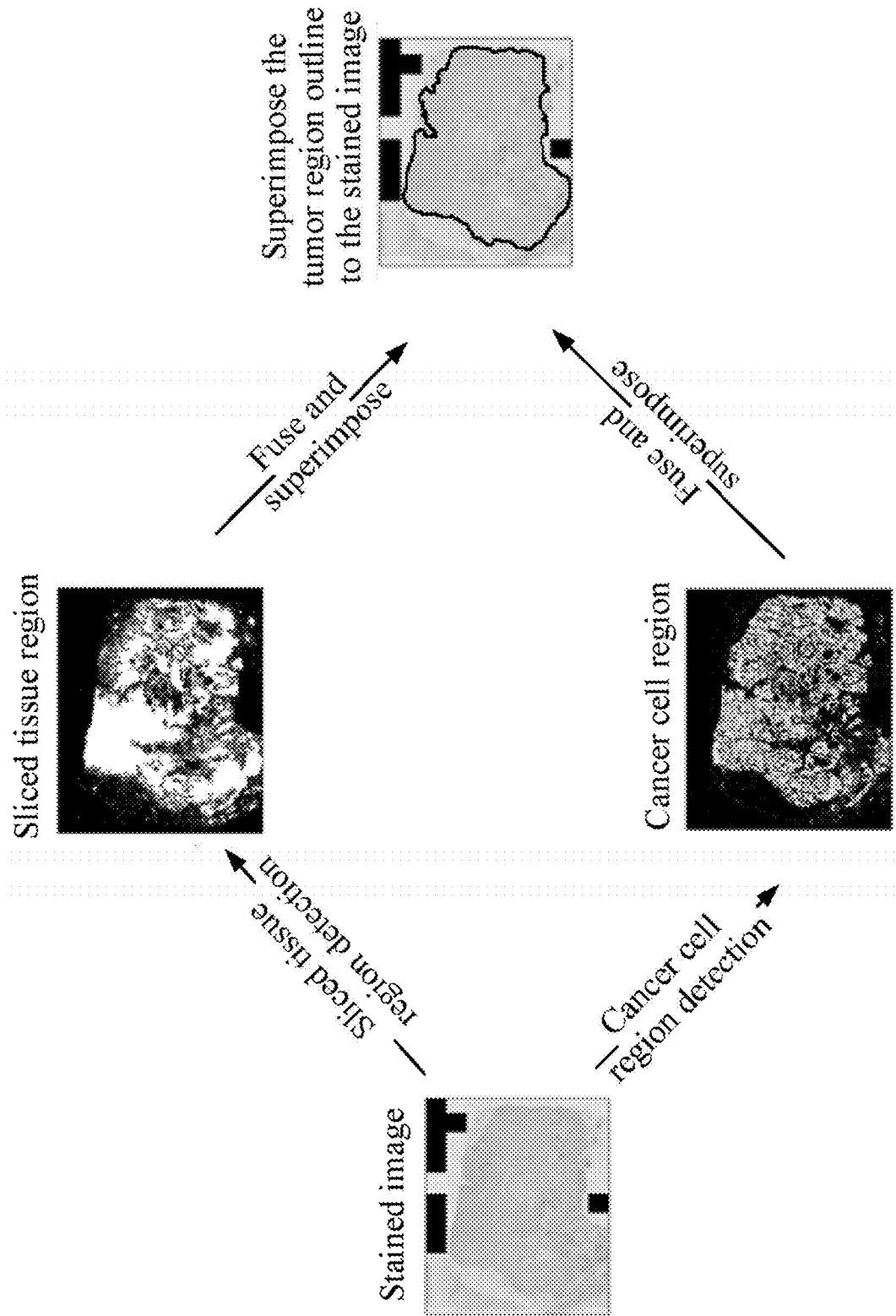
FIG. 9 is a schematic flow chart of an artificial intelligence-based image processing method in another embodiment.

Based on this, this application provides an artificial intelligence-based image processing method, which is applied in this scenario to effectively and accurately divide and detect an outline of a target element region and be convenient for subsequent image analysis and processing of the IC score. Specifically, as shown in FIG. 9, the server acquires a stained image, which is obtained by staining a WSI with a PD-L1 stain. The server performs tissue cell detection and cancer cell region detection respectively on the stained image to obtain a sliced tissue region and a cancer cell region. The server fuses the sliced tissue region with the cancer cell region, then determines a tumor region outline, and superimposes the tumor region outline into the stained image, so that an IC score can be estimated directly according to a superimposition result subsequently, instead of comparing two stained images for analysis, and the accuracy of estimation of the IC score can be effectively ensured.

Figure 10:
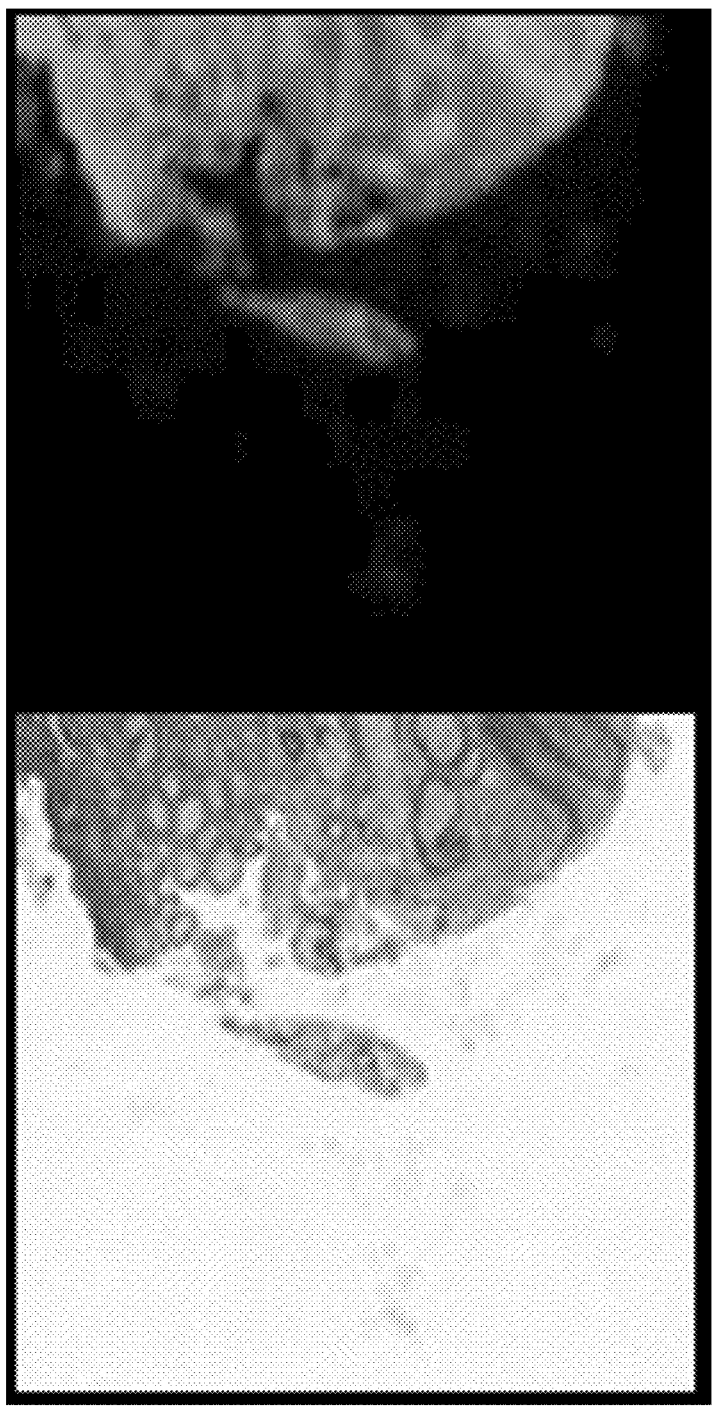
FIG. 10 is a schematic diagram of a result of color segmentation processing in one embodiment.

Further, the sliced tissue region can be effectively detected using prior knowledge, that is, a non-tissue region tends to be grey, and a tissue region is obviously stained. Therefore, whether one pixel point belongs to a background region or a stained tissue cell can be determined by determining whether the pixel point is grey or colored. Considering that a WSI image has a large size, region division can be first performed on the stained image to obtain various regions of interest (ROI). The tissue region detection is achieved by traversing and processing each ROI. Specifically, in each ROI, a local threshold is calculated using color difference values of the pixel points to achieve segmentation on a background region and a tissue region of the current ROI, thus separating the sliced tissue region from the stained image. For each ROI, the sliced tissue region detection is as the following formula (1), $$\text{Diff}_{roi}(x,y) = \text{Abs}\{\text{Max}[\text{ROI}(x,y,i)]|_{i=1,2,3} - \text{Min}[\text{ROI}(x,y,i)]|_{i=1,2,3}\} \quad (1)$$

where $\text{Diff}_{roi}(x,y)$ refers to a difference value between a maximum value and a minimum value of a pixel value in three different color channels ($i=1,2,3$) of point $(x,y)$ in the ROI. $\text{Max}[\text{ROI}(x,y,i)]|_{i=1,2,3}$ is used for determining the maximum value of the three color channels of point $(x, y)$; $\text{Min}[\text{ROI}(x,y,i)]|_{i=1,2,3}$ is used for determining the minimum value of the three color channels of point $(x, y)$; and $\text{Abs}\{\ \}$ is used for determining an absolute value of the difference value between the maximum value and the minimum value. In this embodiment, the color channels ($i=1,2,3$) of the image include three channels R, G and B, and may also be channels of other color spaces, such as a Hue-Saturation-Value (HSV) color space. Generally, if a certain pixel point is a color pixel, the value of $\text{Abs}\{\ \}$ is larger; if the pixel point is a grayscale pixel, the value of $\text{Abs}\{\ \}$ is smaller. As shown in FIG. 10, in one embodiment, a color segmented image $\text{Diff}_{roi}(x,y)$ on the right is obtained after color segmentation is performed on the stained image on the left ROI(x,y). In the color segmented image, the grey pixel region is the sliced tissue region.

Figure 11:
FIG. 11 is a schematic diagram of a result of binarization segmentation processing in the embodiment shown in FIG. 10.

After the color segmented image is obtained, binarization segmentation is further performed on the color segmented image, so as to determine an element region in the image to be processed. Specific processing is as the following formula (2), $$\text{Mask}_{roi}(x,y) = \text{Binary}\{\text{GaussianBlur}[\text{Diff}_{roi}(x,y)]\}|_{\text{Thresh}=\text{Diff}(x,y)/10} \quad (2)$$

where fuzzy denoising is first performed on the color segmented image $\text{Diff}_{roi}(x,y)$, specifically using Gaussian fuzzy denoising GaussianBlur[ ]; binarization Binary{ } calculation is then performed on each pixel point, specifically by performing binarization segmentation with a binarization segmentation threshold Thresh=Diff(x,y)/10 to obtain a binarization segmentation result $Mask_{roi}(x, y)$; and a sliced tissue in the stained image can be determined according to the binarization segmentation result. As shown in FIG. 11, the binarization segmentation result obtained by performing the binarization segmentation on the color segmented image in the embodiment shown in FIG. 10, where the white region is the sliced tissue region.

Figure 12:
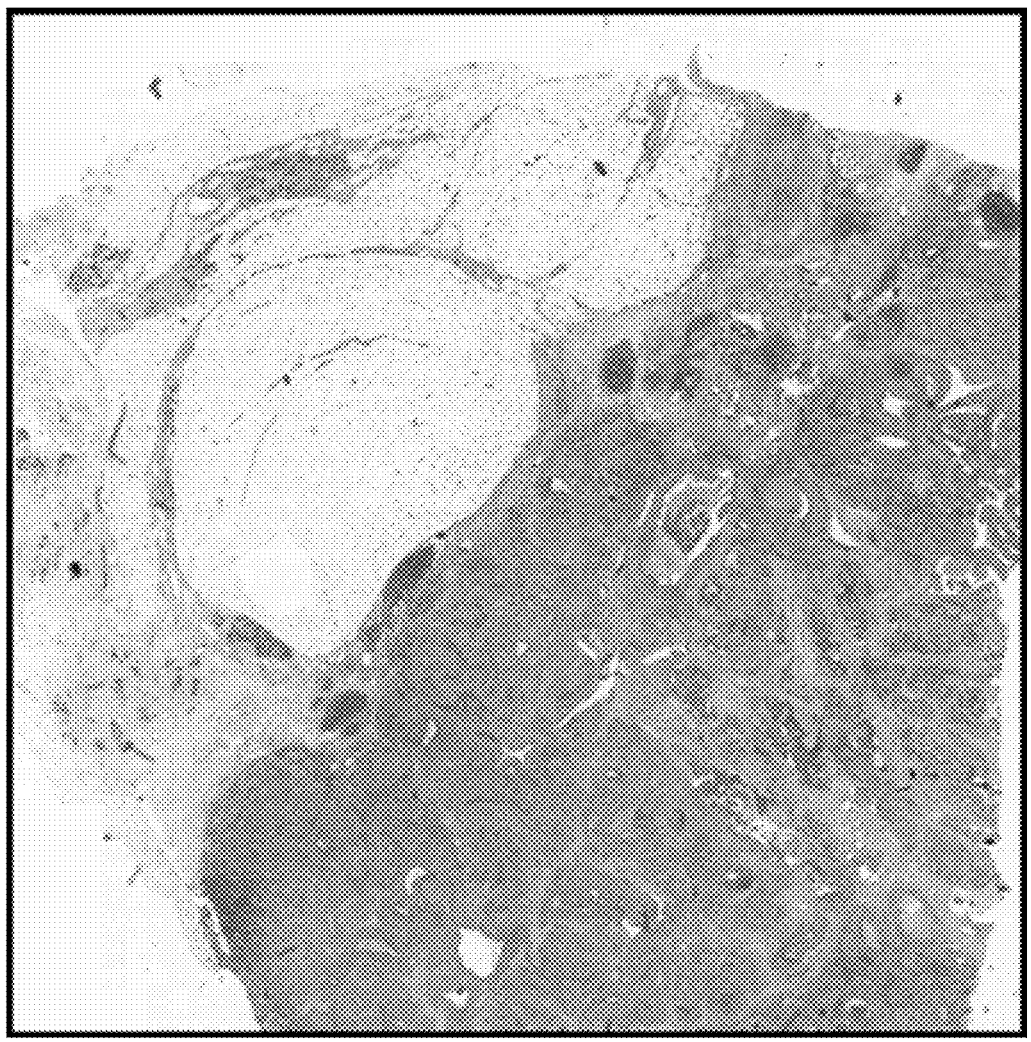
FIG. 12 is a stained image in one embodiment.
Figure 13:
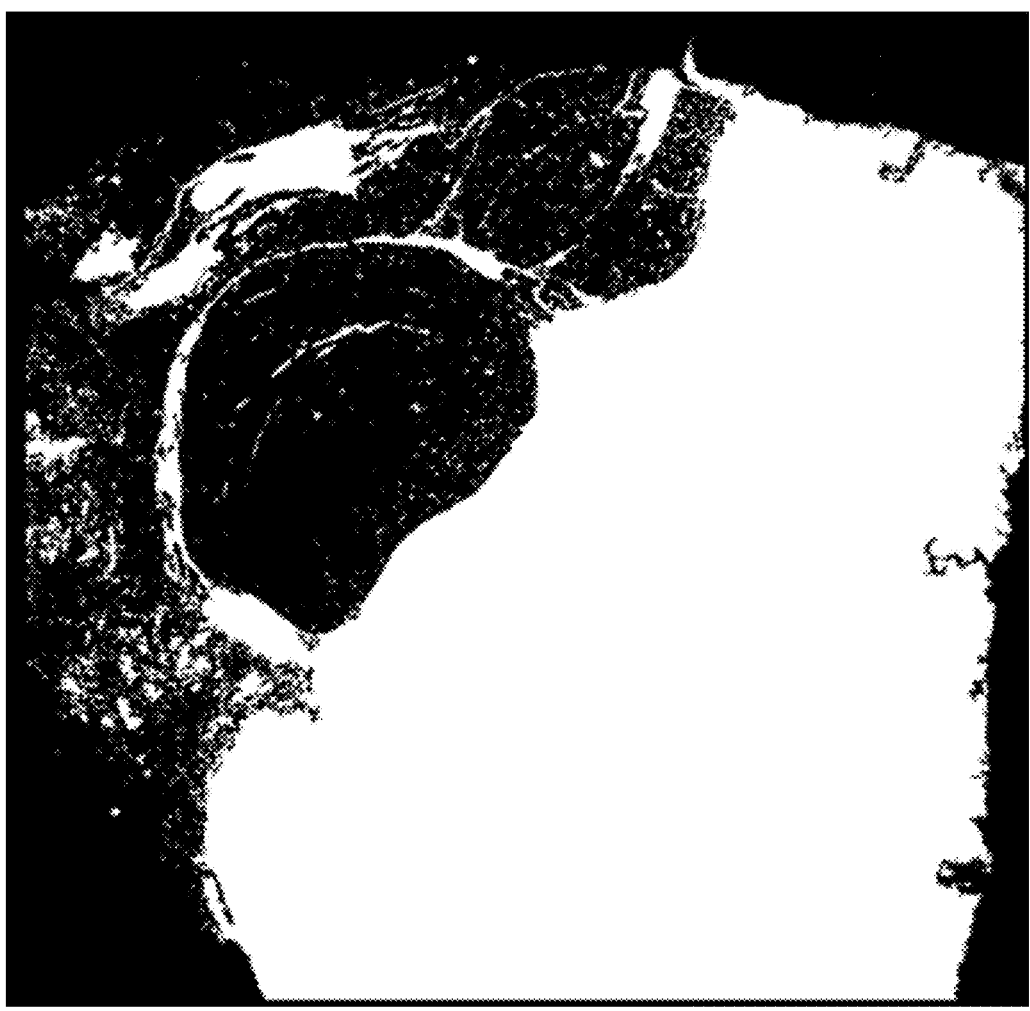
FIG. 13 is a schematic diagram of a result of a detected sliced tissue region in the embodiment shown in FIG. 12.

As shown in FIGS. 12-13, in one embodiment, FIG. 12 is a stained image, and FIG. 13 is the sliced tissue region (white region) determined after the sliced tissue detection is performed on the stained image of FIG. 12.

Figure 14:
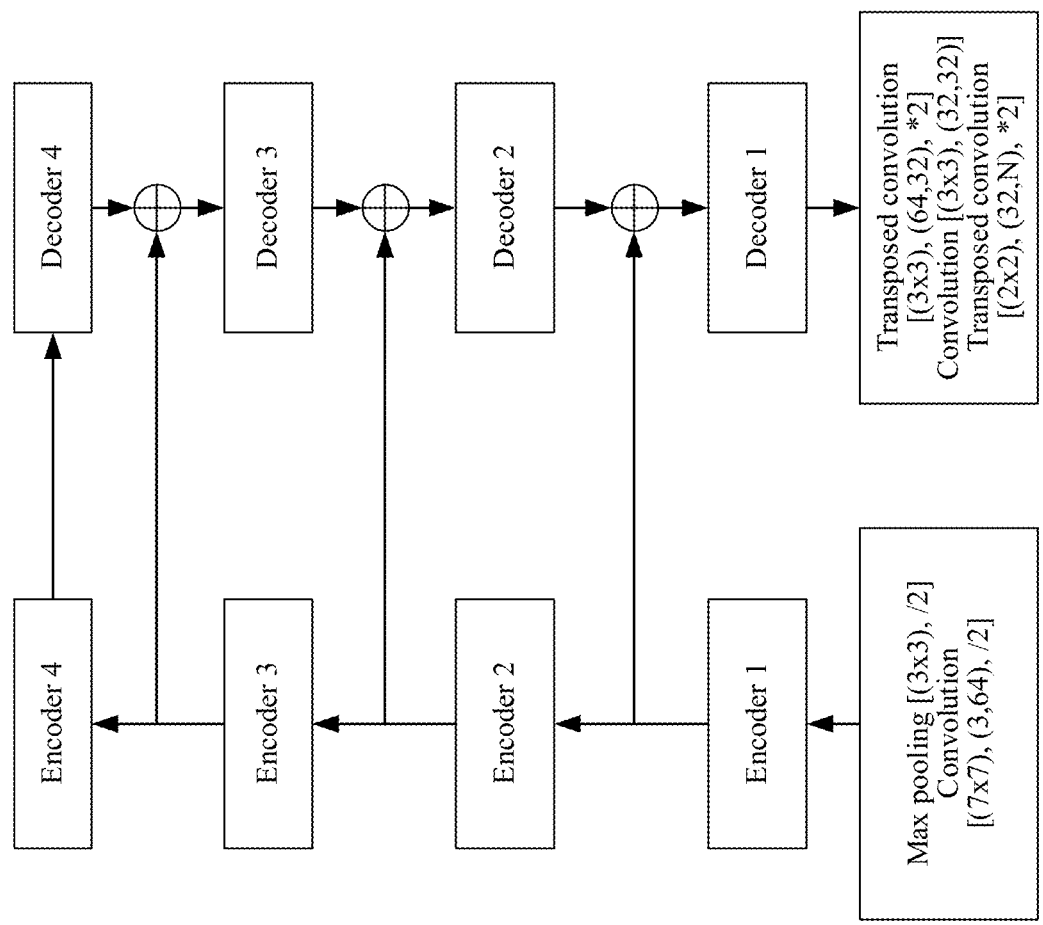
FIG. 14 is a network model structure in one embodiment.

In another aspect, cancer cell region detection is performed on the stained image through a pre-trained Linknet network model (Chaurasia2017). As shown in FIG. 14, in the Linknet network model structure, convolution processing is a convolution operation through conv, and transposed convolution means a convolution operation through full-conv; /2 means downsampling of factor 2, implemented using convolution with a step length; and *2 means upsampling of factor 2. Batch normalization (BN) and a rectified linear unit (ReLU) are used between convolutional layers. The left half is an encoder block, and the right half is a decoder block. There is an initial block at the beginning of the encoder block, and the rest is composed of residual blocks. The network model is trained using a 900 labeled image (832*832 pixels, 0.848 µm/pixel). In specific applications, if there is labeling data for the tumor cell region, a model can be directly trained for tumor region detection. However, in practical engineering, it is very difficult to obtain sufficient labeling. A tumor region actually contains a variety of complex pathological tissues. Even if the tumor region is labeled, it is relatively hard to train a deep learning network, that is, it is hard to obtain an actually useful tumor region. Based on this, considering that cancer cells are very different from other pathological tissues, it is not necessary to label the tumor region, but only the cancer cell region needs to be labeled. The model is trained through a labeled image with a labeled cancer cell region. On a test set of more than 200 images, when the model accuracy reaches the level: F1 (F-measure)=0.89, recall=0.89, and precision=0.91, the training can be ended, and a trained model is obtained.

Figure 15:
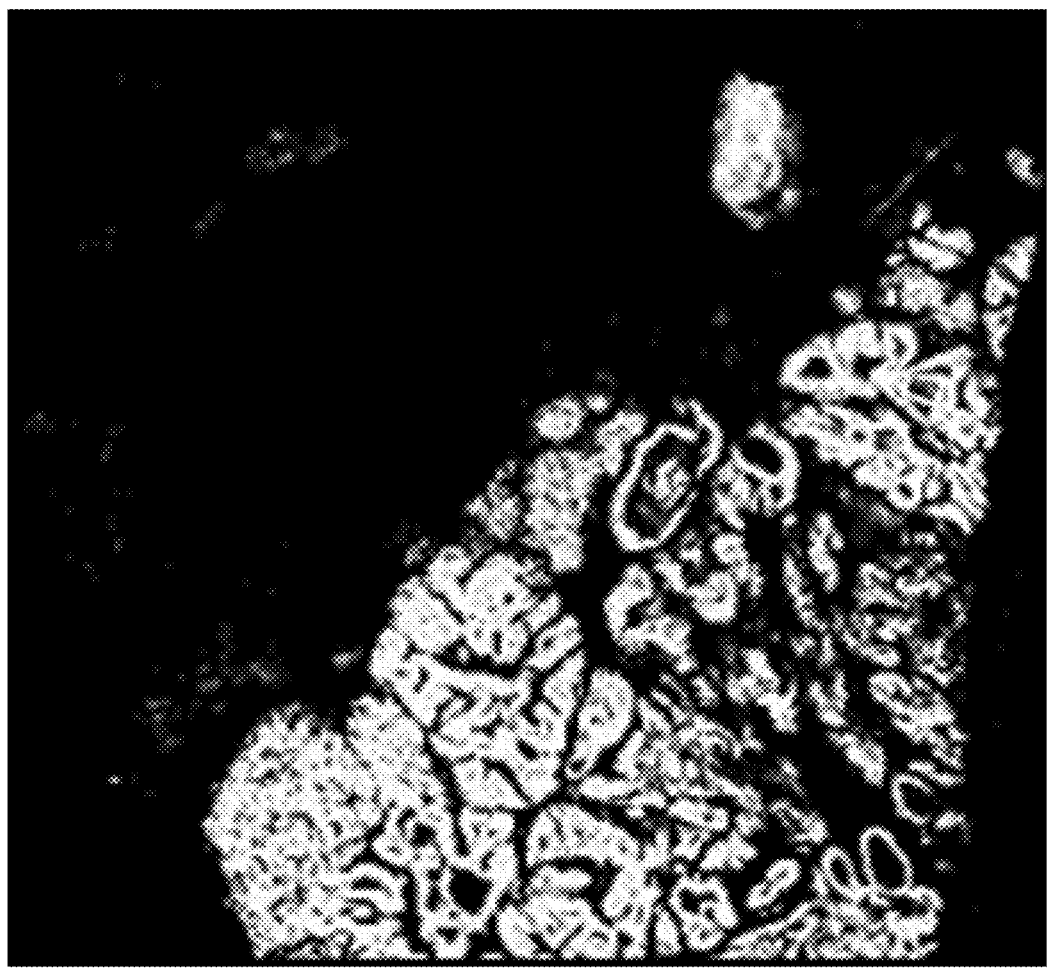
FIG. 15 is a cancer cell region probability graph outputted by a model in one embodiment.
Figure 16:
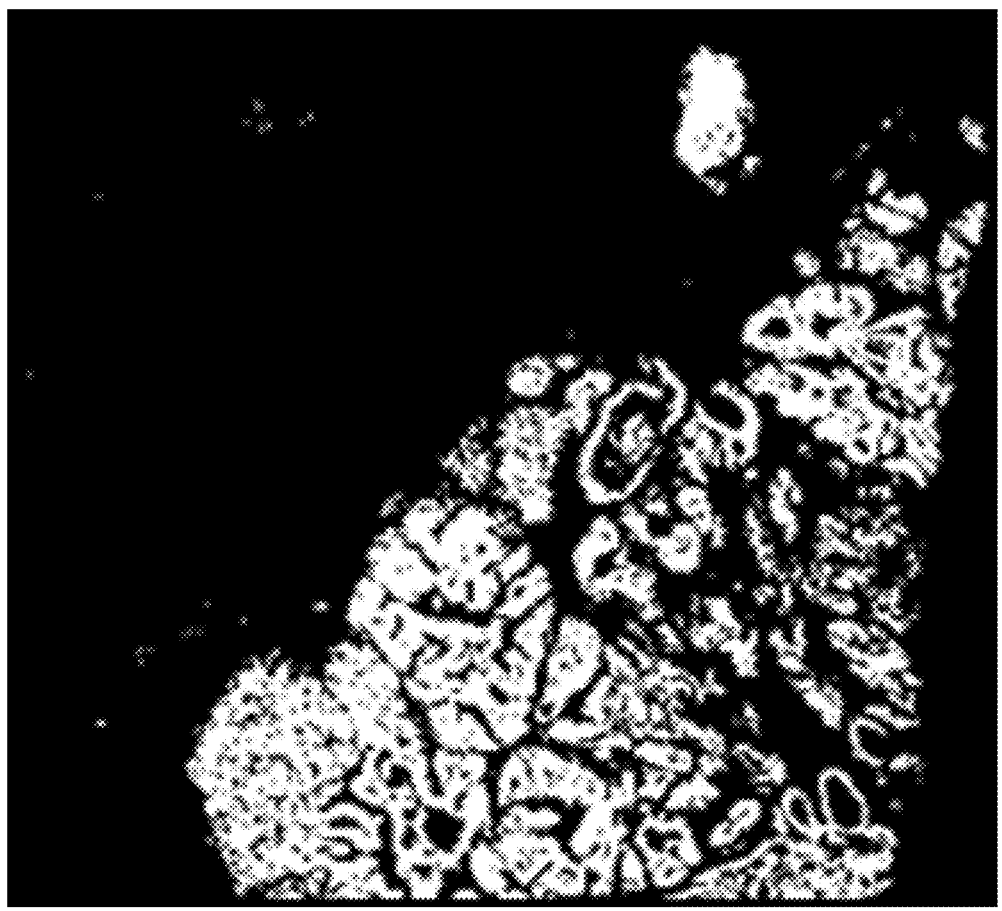
FIG. 16 is a schematic diagram of a result of a cancer cell region determined in the embodiment of FIG. 15.

The trained Linknet network model is used to predict the ROIs of the stained image one by one, and the ROIs are stitched to obtain a predicted cancer cell region probability graph, from 0 to 1. Binarization mapping is performed using a probability threshold of 0.5 on the basis of the cancer cell region probability graph to obtain a binarized cancer cell region result. As shown in FIG. 15, it is a cancer cell region probability graph obtained by performing cancer cell region prediction on the stained image on the basis of the linkNet network model in one embodiment. As shown in FIG. 16, it shows the cancer cell region result obtained after performing the binarization mapping on the cancer cell region probability graph using the probability threshold of 0.5. The white region is the cancer cell region.

Further, after the sliced tissue region and the cancer cell region are obtained, considering the interstitium connecting the cancer cell regions, an envelope of the entire cancer cell region is searched, that is, a tumor region is determined. The envelope of the cancer cell region is found by calculating a connected region. Specifically, a filter with 10*10 pixels is used to traverse the image with the detected cancer cell region one by one. Within the range of 10*10 pixels, the ROI of the entire 10*10 pixels is regarded as a connected region as long as there are pixels (white pixel points) with pixel values greater than 0. The filter of 10*10 pixels is correspondingly used to a scaled image of about 50 µm/pixel. Further, morphological expansion is achieved using a circular kernel of 4*4 to acquire a smooth edge. At the same time, a smaller region is denoised, which further improves the accuracy of the entire outline of the cancer region.

Figure 17:
FIG. 17 is a schematic diagram of a connected domain detection result in the embodiment of FIG. 16.
Figure 18:
FIG. 18 is a schematic diagram of a removal result after removal of a black hole in the embodiment of FIG. 17.
Figure 19:
FIG. 19 is a schematic diagram of a result after morphological expansion in the embodiment of FIG. 18.

As shown in FIG. 17, it is a connected domain detection result obtained by performing region connection on the cancer cell region shown in FIG. 16. FIG. 18 is a removal result after a black hole is removed for the connected domain detection result in FIG. 17. FIG. 19 is an overall outline result of the cancer region obtained after the morphological expansion is performed for the removal result of FIG. 18.

Figure 20:
FIG. 20 is a schematic diagram of a result of fusion in the embodiments shown in FIG. 16 and FIG. 18.
Figure 21:
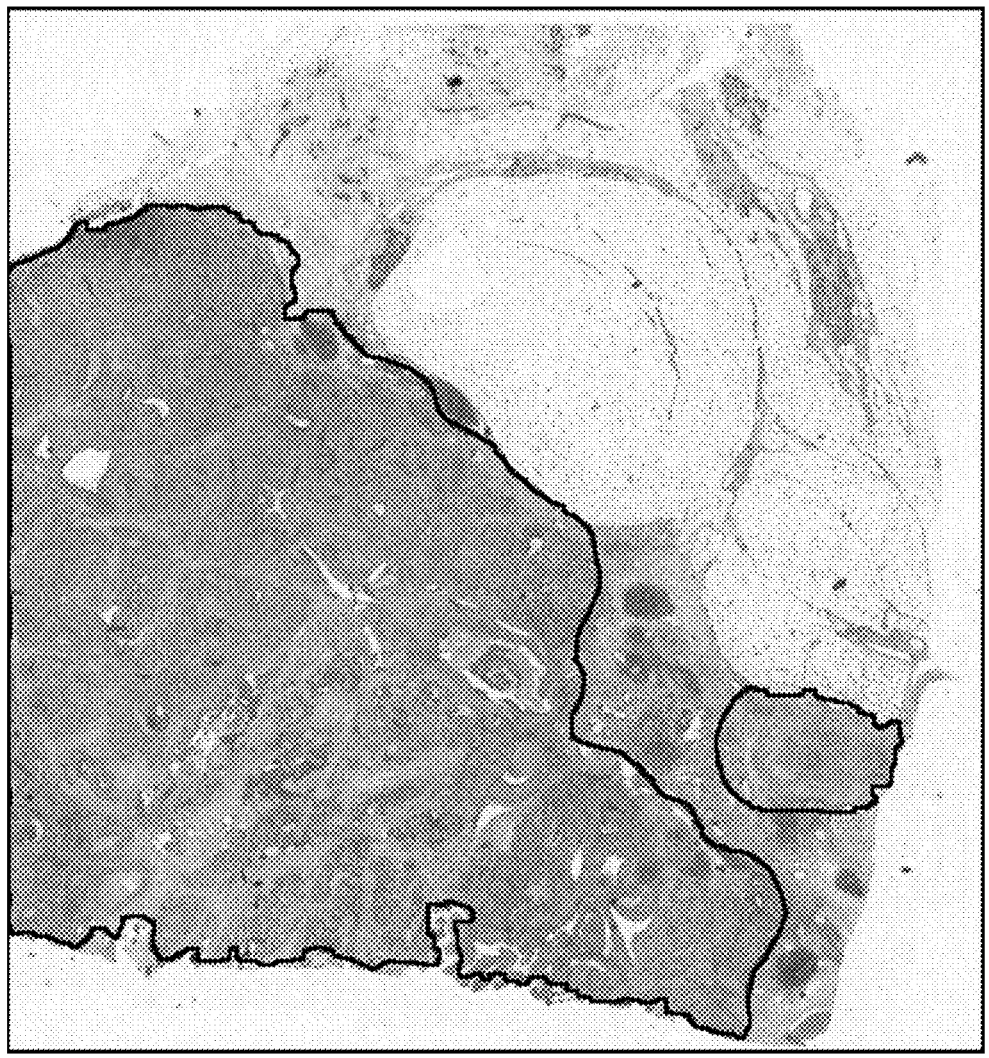
FIG. 21 is a schematic diagram of a result of a superimposed stained image in the embodiment of FIG. 20.

After the overall outline result of the cancer region is obtained, the sliced tissue region and the overall outline result of the cancer region are fused. Specifically, a tumor region can be obtained by calculating an intersection of the sliced tissue region and the overall outline result. The tumor region refers to the cancer cell region and part of stroma between the cancer cell regions. Regions of all tissues can be obtained by the sliced tissue region detection. These regions include tumor regions and non-tumor regions. The non-tumor regions can be determined using the cancer cell region detection. A tumor region detection result can be obtained by fusing the two results. As shown in FIG. 20, it is a cancer cell region outline obtained by fusing the cancer cell region in FIG. 18 with the sliced tissue region in FIG. 16, that is, a tumor region result. Further, the tumor region is superimposed to the original stained image to label the detected tumor region directly in the stained image. As shown in FIG. 21, it shows the labeling after the tumor region in FIG. 20 is superimposed to the stained image. It can be seen that the edge of the tumor region is fitted, and a stained part in the non-tumor region is also well removed.

It should be understood that although the steps in the flowcharts of FIG. 2-FIG. 3 are sequentially displayed in accordance with instructions of arrows, these steps are not necessarily performed sequentially in the order indicated by the arrows. Unless otherwise clearly specified in this specification, the steps are performed without any strict sequence limit, and may be performed in other sequences. Moreover, at least some of the steps in FIG. 2-FIG. 3 may include a plurality of steps or a plurality of stages. These steps or stages are not necessarily performed at the same moment, but may be performed at different moments. These steps or stages are not necessarily performed sequentially, but may be performed in turn or alternately with other steps or at least some of steps or stages of the other steps.

Figure 22:
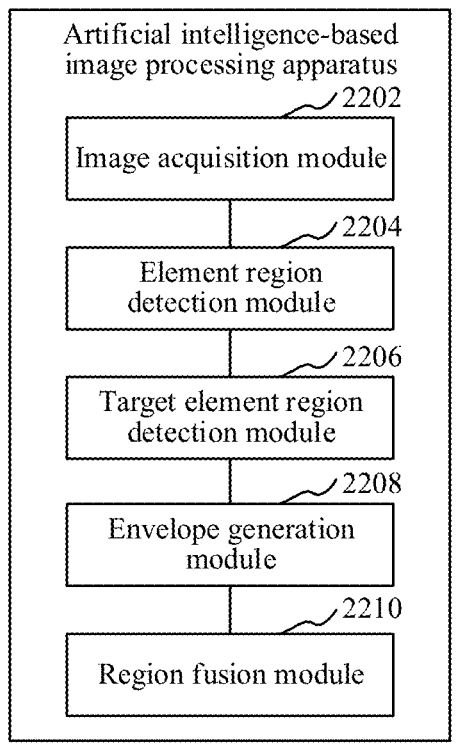
FIG. 22 is a structural block diagram of an artificial intelligence-based image processing apparatus in one embodiment.

In one embodiment, as shown in FIG. 22, an artificial intelligence-based image processing apparatus 2200 is provided. The apparatus may be a part of a computer device by using a software module or a hardware module or combining a software module and a hardware module. The apparatus specifically includes: an image acquisition module 2202, an element region detection module 2204, a target element region detection module 2206, an envelope generation module 2208 and a region fusion module 2210.

The image acquisition module 2202 is configured to acquire an image to be processed;

an element region detection module 2204 is configured to perform element region detection on the image to be processed to determine an element region in the image to be processed;

the target element region detection module 2206 is configured to detect a target element region in the image to be processed using an artificial intelligence-based technique;

the envelope generation module 2208 is configured to search an envelope for the detected target element region to generate a target element envelope region; and the region fusion module 2210 is configured to fuse the element region and the target element envelope region to obtain a target element region outline.

In this embodiment, the target element region in the image to be processed is detected by the target element region detection module through an artificial intelligence-based technique; the envelope is searched for the target element region by the envelope generation module to obtain the target element envelope region; and the element region determined by the element region detection module by means of element region detection is fused with the target element envelope region by the region fusion module to obtain the target element region outline. The envelope is searched for the target element region detected through the artificial intelligence-based technique, so that the accurate target element envelope region can be obtained by effectively using the detection result of the artificial intelligence-based technique; meanwhile, by means of fusing the element region in the image to be processed with the target element envelope region, the target element envelope region can be corrected using a result of the element region detection, and the accuracy of the detected and divided target element region outline is improved.

In one embodiment, the element region detection module 2204 includes a channel difference value feature determination module, a color segmentation module and a binarization segmentation module, where: the channel difference value feature determination module is configured to determine channel difference value features respectively corresponding to various pixel points in the image to be processed; the color segmentation module is configured to perform color segmentation on the image to be processed on the basis of the channel difference value features respectively corresponding to the various pixel points to obtain a color segmented image; and the binarization segmentation module is configured to perform binarization segmentation on the color segmented image to obtain the element region in the image to be processed.

In one embodiment, the channel difference value feature determination module includes a pixel value determination module, a channel value determination module and a maximum channel difference determination module, where: the pixel value determination module is configured to determine a pixel value corresponding to each pixel point in the image to be processed; the channel value determination module is configured to obtain various color channel values of the corresponding pixel point according to the pixel value; the maximum channel difference determination module is configured to determine a maximum channel difference value between the various color channel values, and obtain, according to the maximum channel difference value, the channel difference value feature; and the color segmentation module is further configured to perform pixel value mapping on the image to be processed according to the maximum channel difference values corresponding to the various pixel points to obtain the color segmented image.

In one embodiment, the binarization segmentation module includes a denoising module, a segmentation threshold acquisition module and a segmentation processing module; where: the denoising module is configured to denoise the color segmented image to obtain a denoised image; the segmentation threshold acquisition module is configured to acquire a binarization segmentation threshold; and the segmentation processing module is configured to perform binarization segmentation on the denoised image on the basis of the binarization segmentation threshold and pixel values corresponding to various pixel points in the denoised image to obtain the element region in the image to be processed.

In one embodiment, the segmentation processing module includes a pixel value analysis module, a binarization mapping module and a mapping result analysis module; where: the pixel value analysis module is configured to determine the pixel values corresponding to the various pixel points in the denoised image; the binarization mapping module is configured to perform, on the basis of the binarization segmentation threshold, pixel binarization mapping respectively on the pixel values corresponding to the various pixel points in the denoised image to obtain pixel mapping results corresponding to the various pixel points in the denoised image; and the mapping result analysis module is configured to obtain the element region in the image to be processed according to the pixel mapping results corresponding to the various pixel points in the denoised image.

In one embodiment, the target element region detection module 2206 includes a model inquiry module, a model processing module and a model result processing module; where: the model inquiry module is configured to inquire a target element region detection model pre-trained using training image data labeled with the target element region; the model processing module is configured to perform target element region detection on the image to be processed through the target element region detection model to obtain a target element region probability graph; and the model result processing module is configured to perform target element region determination on the target element region probability graph, and obtain, according to a determination result, the target element region in the image to be processed.

In one embodiment, the model processing module includes a region of interest module, a probability graph obtaining module and a probability graph stitching module; where: the region of interest module is configured to acquire various regions of interest obtained by region division processing of the image to be processed; the probability graph obtaining module is configured to respectively input the various regions of interest into the target element region detection model for target element region detection to obtain region of interest probability graphs outputted by the target element region detection model and respectively corresponding to the various regions of interest; and the probability graph stitching module is configured to stitch the various region of interest probability graphs to obtain the target element region probability graph corresponding to the image to be processed.

In one embodiment, the model result processing module includes a probability threshold acquisition module, a probability threshold mapping module and a target element region module; where: the probability threshold acquisition module is configured to acquire a probability threshold; the probability threshold mapping module is configured to perform probability binarization mapping on the target element region probability graph on the basis of the probability threshold and probability values corresponding to various pixel points in the target element region probability graph to obtain probability mapping results of the various pixel points in the target element region probability graph; and the target element region module is configured to obtain the target element region in the image to be processed according to the probability mapping results of the various pixel points in the target element region probability graph.

In one embodiment, the envelope generation module 2208 includes a region connection module, a region filling module and a region expansion module; where: the region connection module is configured to perform region connection on the target element region in the image to be processed to generate a target element connected region; the region filling module is configured to remove a non-target element region located in the target element connected region to obtain an updated target element connected region; and the region expansion module is configured to perform morphological expansion on the updated target element connected region to obtain the target element envelope region.

In one embodiment, the region connection module includes a filtering region obtaining module, a region type analysis module and a connection processing module; where: the filtering region obtaining module is configured to perform filtering division on the target element region and the non-target region in the image to be processed to obtain various filtering regions; the region type analysis module is configured to perform region type analysis on the basis of pixel values of pixel points in the various filtering regions to obtain analysis results; and the connection processing module is configured to connect the filtering regions which have the analysis results indicating a connected region type, and generating the target element connected region.

In one embodiment, the apparatus further includes a superimposition processing module, configured to superimpose the target element region outline to the image to be processed, and identify the target element region outline in the image to be processed in a predetermined identification manner.

Specific limitations to the artificial intelligence-based image processing apparatus may refer to the limitation to the artificial intelligence-based image processing method above. All or some of the modules in the artificial intelligence-based image processing apparatus may be implemented by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device is provided. The computer device may be a server, and an internal structure diagram thereof may be shown in FIG. 23. The computer device includes a processor, a memory, and a network interface that are connected by using a system bus. The processor of the computer device is configured to provide computing and control capabilities. The memory of the computer device includes a non-volatile storage medium and an internal memory. The non-volatile storage medium stores an operating system, computer-readable instructions and a database. The internal memory provides an environment for running of the operating system and the computer-readable instructions in the non-volatile storage medium. The database of the computer device is configured to store data. The network interface of the computer device 1 is configured to communicate with an external terminal through a network connection. The computer-readable instructions, when executed by a processor, implement the artificial intelligence-based image processing method.

Figure 23:
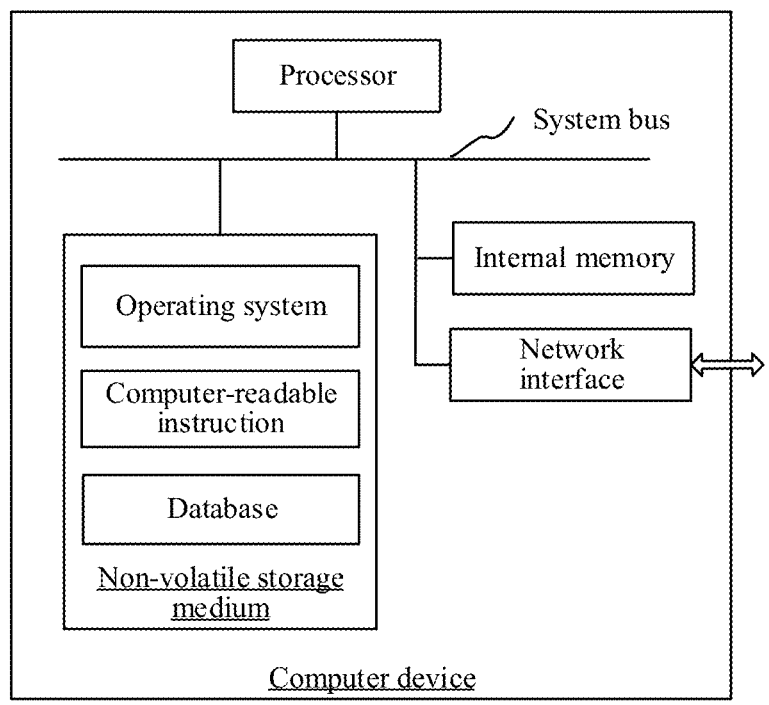
FIG. 23 is an internal structure diagram of a computer device according to an embodiment.

A person skilled in the art may understand that, the structure shown in FIG. 23 is only a block diagram of a part of a structure related to a solution of this application and does not limit the computer device to which the solution of this application is applied. Specifically, the computer device may include more or less members than those in the drawings, or include a combination of some members, or include different member layouts.

In an embodiment, a computer device is further provided, including: a memory and one or more processors. The memory stores computer-readable instructions, the computer-readable instructions, when executed by the processors, causing the one or more processors to perform steps in any method embodiment described above.

In an embodiment, one or more non-volatile readable storage media storing computer-readable instructions are provided, the computer-readable instructions, when executed by one or more processors, causing the one or more processors to perform steps in any method embodiment described above.

In an embodiment, a computer program product or a computer program is provided. The computer program product or the computer program includes computer-readable instructions, and the computer-readable instructions are stored in a computer-readable storage medium. The processor of the computer device reads the computer-readable instructions from the computer-readable storage medium, and the processor executes the computer-readable instructions, to cause the computer device to perform steps in any method embodiment described above.

A person of ordinary skill in the art may understand that all or some of procedures of the method in the foregoing embodiments may be implemented by a computer program instructing relevant hardware. The computer program may be stored in a non-volatile computer-readable storage medium. When the computer program is executed, the procedures of the foregoing method embodiments may be implemented. Any reference to a memory, a storage, a database, or another medium used in the embodiments provided in this application may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM) and the like.

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

In sum, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

The foregoing embodiments only describe several implementations of this application, which are described specifically and in detail, but cannot be construed as a limitation to the patent scope of the present disclosure. It should be noted that for a person of ordinary skill in the art, several transformations and improvements can be made without departing from the idea of this application. These transformations and improvements belong to the protection scope of this application. Therefore, the protection scope of the patent of this application shall be subject to the appended claims.

What is claimed is:

1. An artificial intelligence-based face image processing method, implemented by a computer device, the method comprising:
    acquiring an image of a pathological tissue;
    determining pixel values of pixel points in the image;
    obtaining multiple color channel values of each corresponding pixel point according to its corresponding pixel value;
    determining a maximum channel difference value between the multiple color channel values of each pixel point in the image;
    performing pixel value mapping on the image according to the maximum channel difference values corresponding to the pixel points in the image to obtain a color segmented image of the pathological tissue;
    performing pixel value-based binarization segmentation on the color segmented image to obtain an element region in the image;
    processing the pixel values of the pixel points in the image of the pathological tissue using a target element region detection model to obtain a probability graph of the pixel points in the image, wherein values in the probability graph corresponding to the pixel points represent a probability that the pixel points reflect a target element;
    performing probability-based binarization segmentation on the probability graph to detect a target element region in the image;
    generating a target element envelope region by searching for an envelope of the detected target element region in the image;
    fusing the element region and the target element envelope region to obtain a target element region outline in the image; and
    estimating a ratio of the target element envelope region in the image according to the target element region outline in the image to obtain an immune cells (IC) score of the pathological tissue.

2. The method according to claim 1, wherein performing pixel value-based binarization segmentation on the color segmented image comprises:
    denoising the color segmented image to obtain a denoised image;
    acquiring a binarization segmentation threshold; and
    performing pixel value-based binarization segmentation on the denoised image based on the binarization segmentation threshold and pixel values corresponding to various pixel points in the denoised image to obtain the element region in the image.

3. The method according to claim 2, wherein performing pixel value-based binarization segmentation on the denoised image comprises:
    determining the pixel values corresponding to the various pixel points in the denoised image;
    performing, based on the binarization segmentation threshold, pixel binarization mapping on the pixel values corresponding to the various pixel points in the denoised image to obtain pixel mapping results corresponding to the various pixel points in the denoised image; and
    obtaining the element region in the image to be processed according to the pixel mapping results corresponding to the various pixel points in the denoised image.

4. The method according to claim 1, wherein processing the pixel values of the pixel points in the image of the pathological tissue using a target element region detection model to obtain a probability graph of the pixel points in the image comprises:
    acquiring various regions of interest obtained by region division processing of the image;
    obtaining region of interest probability graphs outputted by the target element region detection model corresponding to the various regions of interest by inputting the various regions of interest into the target element region detection model; and
    stitching the various regions of the interest probability graphs to obtain the target element region probability graph corresponding to the pixel points in the image.

5. The method according to claim 1, wherein performing probability-based binarization segmentation on the probability graph to detect a target element region in the image comprises:
    acquiring a probability threshold;
    performing probability binarization mapping on the target element region probability graph based on the probability threshold and probability values corresponding to various pixel points in the target element region probability graph to obtain probability mapping results of the various pixel points in the target element region probability graph; and
    obtaining the target element region in the image according to the probability mapping results of the various pixel points in the target element region probability graph.

6. The method according to claim 1, wherein generating the target element envelope region comprises:
    connecting regions in the target element region of the image to generate a target element connected region;
    removing a non-target element region within the target element connected region to obtain an updated target element connected region; and
    performing morphological expansion on the updated target element connected region to obtain the target element envelope region.

7. The method according to claim 6, wherein connecting the regions in the target element region comprises:
    performing filtering division on the target element region and the non-target region in the image to be processed to obtain various filtering regions;
    performing region type analysis based on pixel values of pixel points in the various filtering regions to obtain analysis results; and
    connecting filtering regions indicated, based on the analysis results, as a connected region type, and generating the target element connected region.

8. The method according to claim 1, the method further comprising:
    superimposing the target element region outline on the image, and identifying the target element region outline in the image using a predetermined identification manner.

9. An electronic device, comprising:
    one or more processors; and
    memory storing one or more programs, the one or more programs comprising instructions that, when executed by the one or more processors, cause the one or more processors to perform operations comprising:
    acquiring an image of a pathological tissue;

determining pixel values of pixel points in the image;
obtaining multiple color channel values of each corresponding pixel point according to its corresponding pixel value;
determining a maximum channel difference value between the multiple color channel values of each pixel point in the image;
performing pixel value mapping on the image according to the maximum channel difference values corresponding to the pixel points in the image to obtain a color segmented image of the pathological tissue;
performing pixel value-based binarization segmentation on the color segmented image to obtain an element region in the image;
processing the pixel values of the pixel points in the image of the pathological tissue using a target element region detection model to obtain a probability graph of the pixel points in the image, wherein values in the probability graph corresponding to the pixel points represent a probability that the pixel points reflect a target element;
performing probability-based binarization segmentation on the probability graph to detect a target element region in the image;
generating a target element envelope region by searching for an envelope of the detected target element region in the image;
fusing the element region and the target element envelope region to obtain a target element region outline in the image; and
estimating a ratio of the target element envelope region in the image according to the target element region outline in the image to obtain an immune cells (IC) score of the pathological tissue.

10. The electronic device according to claim 9, wherein performing pixel value-based binarization segmentation on the color segmented image comprises:
denoising the color segmented image to obtain a denoised image;
acquiring a binarization segmentation threshold; and
performing pixel value-based binarization segmentation on the denoised image based on the binarization segmentation threshold and pixel values corresponding to various pixel points in the denoised image to obtain the element region in the image.

11. The electronic device according to claim 10, wherein performing pixel value-based binarization segmentation on the denoised image comprises:
determining the pixel values corresponding to the various pixel points in the denoised image;
performing, based on the binarization segmentation threshold, pixel binarization mapping on the pixel values corresponding to the various pixel points in the denoised image to obtain pixel mapping results corresponding to the various pixel points in the denoised image; and
obtaining the element region in the image to be processed according to the pixel mapping results corresponding to the various pixel points in the denoised image.

12. A non-transitory computer-readable storage medium, storing a computer program, the computer program, when executed by one or more processors of an electronic device, cause the one or more processors to perform operations comprising:
acquiring an image of a pathological tissue;
determining pixel values of pixel points in the image;
obtaining multiple color channel values of each corresponding pixel point according to its corresponding pixel value;
determining a maximum channel difference value between the multiple color channel values of each pixel point in the image;
performing pixel value mapping on the image according to the maximum channel difference values corresponding to the pixel points in the image to obtain a color segmented image of the pathological tissue;
performing pixel value-based binarization segmentation on the color segmented image to obtain an element region in the image;
processing the pixel values of the pixel points in the image of the pathological tissue using a target element region detection model to obtain a probability graph of the pixel points in the image, wherein values in the probability graph corresponding to the pixel points represent a probability that the pixel points reflect a target element;
performing probability-based binarization segmentation on the probability graph to detect a target element region in the image;
generating a target element envelope region by searching for an envelope of the detected target element region in the image;
fusing the element region and the target element envelope region to obtain a target element region outline in the image; and
estimating a ratio of the target element envelope region in the image according to the target element region outline in the image to obtain an immune cells (IC) score of the pathological tissue.

13. The non-transitory computer-readable storage medium according to claim 12, wherein performing pixel value-based binarization segmentation on the color segmented image comprises:
denoising the color segmented image to obtain a denoised image;
acquiring a binarization segmentation threshold; and
performing pixel value-based binarization segmentation on the denoised image based on the binarization segmentation threshold and pixel values corresponding to various pixel points in the denoised image to obtain the element region in the image.

14. The non-transitory computer-readable storage medium according to claim 13, wherein performing pixel value-based binarization segmentation on the denoised image comprises:
determining the pixel values corresponding to the various pixel points in the denoised image;
performing, based on the binarization segmentation threshold, pixel binarization mapping on the pixel values corresponding to the various pixel points in the denoised image to obtain pixel mapping results corresponding to the various pixel points in the denoised image; and
obtaining the element region in the image to be processed according to the pixel mapping results corresponding to the various pixel points in the denoised image.

15. The non-transitory computer-readable storage medium according to claim 12, wherein processing the pixel values of the pixel points in the image of the pathological tissue using a target element region detection model to obtain a probability graph of the pixel points in the image comprises:

acquiring various regions of interest obtained by region division processing of the image;

obtaining region of interest probability graphs outputted by the target element region detection model corresponding to the various regions of interest by inputting the various regions of interest into the target element region detection model; and stitching the various regions of the interest probability graphs to obtain the target element region probability graph corresponding to the pixel points in the image.

16. The non-transitory computer-readable storage medium according to claim 12, wherein performing probability-based binarization segmentation on the probability graph to detect a target element region in the image comprises:

acquiring a probability threshold;

performing probability binarization mapping on the target element region probability graph based on the probability threshold and probability values corresponding to various pixel points in the target element region probability graph to obtain probability mapping results of the various pixel points in the target element region probability graph; and obtaining the target element region in the image according to the probability mapping results of the various pixel points in the target element region probability graph.

17. The non-transitory computer-readable storage medium according to claim 12, wherein generating the target element envelope region comprises:

connecting regions in the target element region of the image to generate a target element connected region;

removing a non-target element region within the target element connected region to obtain an updated target element connected region; and performing morphological expansion on the updated target element connected region to obtain the target element envelope region.

18. The electronic device according to claim 9, wherein processing the pixel values of the pixel points in the image of the pathological tissue using a target element region detection model to obtain a probability graph of the pixel points in the image comprises:

acquiring various regions of interest obtained by region division processing of the image;

obtaining region of interest probability graphs outputted by the target element region detection model corresponding to the various regions of interest by inputting the various regions of interest into the target element region detection model; and stitching the various regions of the interest probability graphs to obtain the target element region probability graph corresponding to the pixel points in the image.

19. The electronic device according to claim 9, wherein performing probability-based binarization segmentation on the probability graph to detect a target element region in the image comprises:

acquiring a probability threshold;

performing probability binarization mapping on the target element region probability graph based on the probability threshold and probability values corresponding to various pixel points in the target element region probability graph to obtain probability mapping results of the various pixel points in the target element region probability graph; and obtaining the target element region in the image according to the probability mapping results of the various pixel points in the target element region probability graph.

20. The electronic device according to claim 9, wherein generating the target element envelope region comprises:

connecting regions in the target element region of the image to generate a target element connected region;

removing a non-target element region within the target element connected region to obtain an updated target element connected region; and performing morphological expansion on the updated target element connected region to obtain the target element envelope region.

* * * * *